Figure 1D:
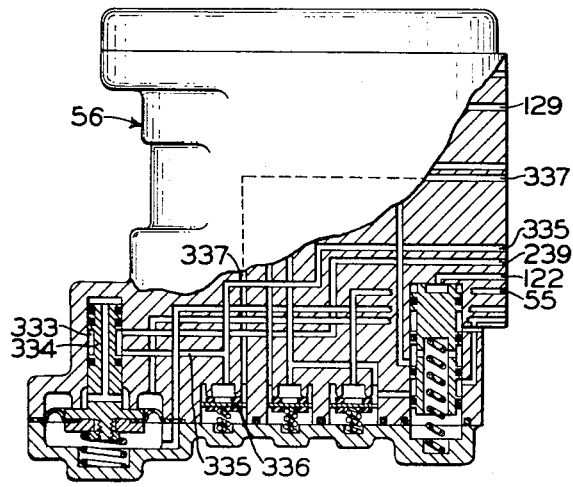

United States Patent [19]

McClure et al.

[11] 3,719,402

[45] March 6, 1973

[54] FLUID PRESSURE BRAKE CONTROL APPARATUS

[75] Inventors: Glenn T. McClure, McKeesport; Robert B. Salton, Pittsburgh, both of Pa.

[73] Assignee: Westinghouse Air Brake Company, Wilmerding, Pa.

[22] Filed: Sept. 17, 1971

[21] Appl. No.: 181,296

[52] U.S. Cl. .........................303/35, 303/18, 303/53
[51] Int. Cl. ..............................................B60t 15/18
[58] Field of Search..................303/7, 13, 18, 25–28, 303/33, 35, 36, 53

[56] References Cited

UNITED STATES PATENTS

| | | | |
|---|---|---|---|
| 2,322,042 | 6/1942 | McClure | 303/18 |
| 3,076,681 | 2/1963 | Erson et al. | 303/18 |
| 3,208,801 | 9/1965 | McClure | 303/36 |
| 3,504,950 | 4/1970 | McClure | 303/35 |

*Primary Examiner*—Duane A. Reger
*Attorney*—Ralph W. McIntire, Jr.

[57] ABSTRACT

This invention relates to a relay-type brake valve device for controlling pressure variations in the brake pipe of a railway fluid pressure brake control system having a self-lapping regulating valve device for supplying fluid under pressure directly to a relay valve device to cause the operation thereof. The regulating valve device is operative in a fluid pressure releasing direction by the rocking in one direction of a pivoted lever in response to rotation of either a service cam rotatable by manual actuation of a brake valve handle or a penalty cam rotatable by a fluid pressure operated penalty and split reduction valve in response to a restrictive train operating condition. A fluid pressure operated clutch mechanism, including a nut and screw each provided with a non-self-locking type of screw thread, is so interlocked with the lever that, in the absence of the supply of fluid under pressure to this clutch, it prevents the rocking of the pivoted lever in the above-mentioned one direction. The brake valve device further includes a new and improved three-position selector valve device for conditioning the brake valve device for use in either freight or passenger service by controlling the supply of fluid under pressure to this clutch. Therefore, the novel three-position selector valve device, while in its freight position, so cooperates with the usual suppression valve device of the brake valve device as to prevent the supply of fluid under pressure to the clutch mechanism until the handle of the brake valve device is manually returned to its release position. Consequently, this new selector device, while in its freight position, provides for operation of the clutch to insure only a direct brake release on the locomotive and cars in the train, and while in its passenger position, provides for operation of the clutch to enable a graduated release.

15 Claims, 5 Drawing Figures

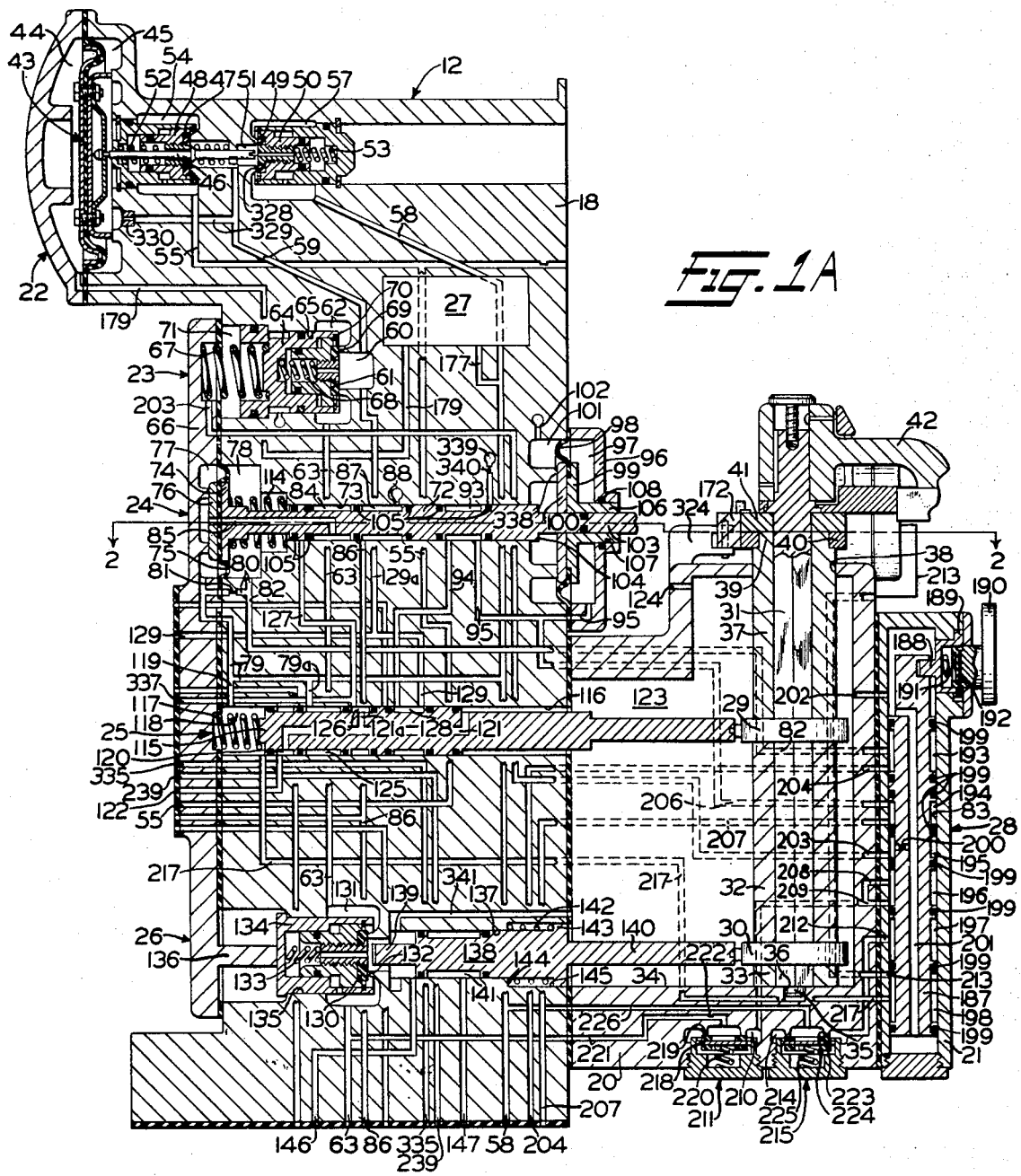

INVENTOR.
GLENN T. McCLURE
ROBERT B. SALTON
BY Ralph W. McIntire, Jr.
ATTORNEY

FLUID PRESSURE BRAKE CONTROL APPARATUS

BACKGROUND OF THE INVENTION

Substantially all locomotives in use in the United States today are provided with an engineer's brake valve device that has associated therewith an equalizing reservoir that is connected to a self-lapping type of regulating valve device constituting an element of this brake valve device by means of pipe and various pipe fittings through which the regulating valve device supplies, via an equalizing reservoir cut-off valve, fluid under pressure to effect charging of this reservoir. These fittings often leak. Consequently, an undesired reduction of the pressure of the fluid in the equalizing reservoir results from this leakage whereupon this undesired reduction causes a corresponding reduction of the pressure in the train brake pipe and an increase in the degree of the brake application on the locomotive and cars in the train at a time when it is desirable that a constant braking force be maintained. Accordingly, it is apparent that a brake valve device that did not require the association therewith of an equalizing reservoir and the required pipe and pipe fittings for connecting it to the brake valve device would be most desirable from a railway equipment operating and maintenance point of view.

Accordingly, it is the general purpose of this invention to provide a novel engineer's brake valve device of the type having a relay valve device operative to cause charging of the train brake pipe from a main storage reservoir on the locomotive, which relay valve device is operative by variations in the pressure of fluid supplied thereto directly from a self-lapping regulating valve device without the use of the heretofore used equalizing reservoir, equalizing reservoir cut-off valve and necessary piping.

SUMMARY OF THE INVENTION

According to the present invention, a novel engineer's brake valve device includes a diaphragm-operated relay valve device operative to cause charging of the train brake pipe from a main storage reservoir on the locomotive and a self-lapping type of regulating valve device for supplying fluid under pressure directly to one side of the diaphragm without the use of an equalizing reservoir and an equalizing reservoir cut-off valve. The regulating valve device is operated by the rocking in one or the other direction of a pivoted lever that is actuated in the fluid pressure releasing direction in response to rotation of either a service cam by the manipulation of the usual brake valve handle or a penalty cam by longitudinal movement of a three-position double-diaphragm operated spool-type penalty and split reduction valve when fluid under pressure is vented from one side of one diaphragm upon the occurrence of a restrictive train operating condition. This spool-type valve and lever are incorporated in the novel brake valve device together with a fluid pressure operated clutch mechanism that includes a nut and screw, each provided with a non-self-locking screw thread, the lever and clutch mechanism being so interlocked as to, in the absence of the supply of fluid under pressure to the clutch mechanism, prevent the rocking of the lever in the direction to cause the regulating valve device to operate to release fluid under pressure from the relay valve device to cause a brake application.

Also incorporated in this novel brake valve device is a new and improved selector valve device that has a three-position valve for (1) controlling the supply of fluid under pressure to the clutch mechanism, (2) connection one side of the one diaphragm of the penalty and split reduction valve to a plurality of penalty brake applying devices, and (3) connecting one side of the other diaphragm of this penalty and split reduction valve to a split reduction reservoir. While in the freight position of this three-position valve, it so cooperates with the usual suppression valve of the brake valve device as, subsequent to a brake application effected by the engineer, to prevent the supply of fluid under pressure to the clutch mechanism until the engineer returns the handle of the brake valve to its release position thereby insuring only a direct brake release on the entire train. Furthermore, while this novel three-position valve occupies its freight position, it connects the split reduction reservoir to the one side of the other diaphragm of the penalty and split reduction valve to thereby provide for a split reduction penalty brake application upon the occurrence of an adverse train operating condition.

Upon manual movement of this new and improved three-position valve to its passenger position, fluid under pressure is constantly supplied to the clutch mechanism to thereby effect unlocking of the nut from the screw so that this screw cannot inhibit rocking of the pivoted lever. Consequently, a graduated brake release can be obtained upon moving the brake valve handle from any position in its application zone in the direction of its release position to any other position in its application zone.

Figure 1B:
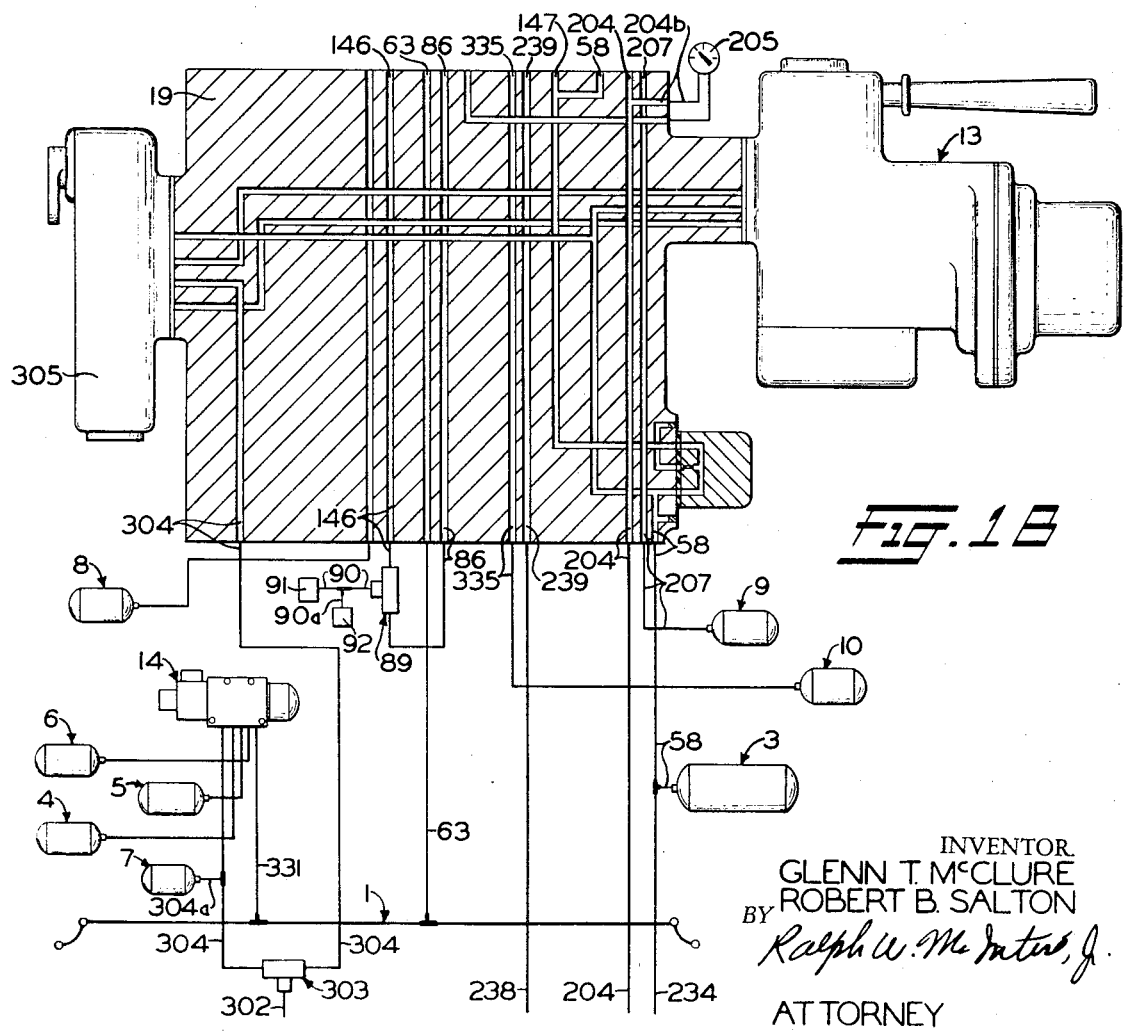
Figure 1C:
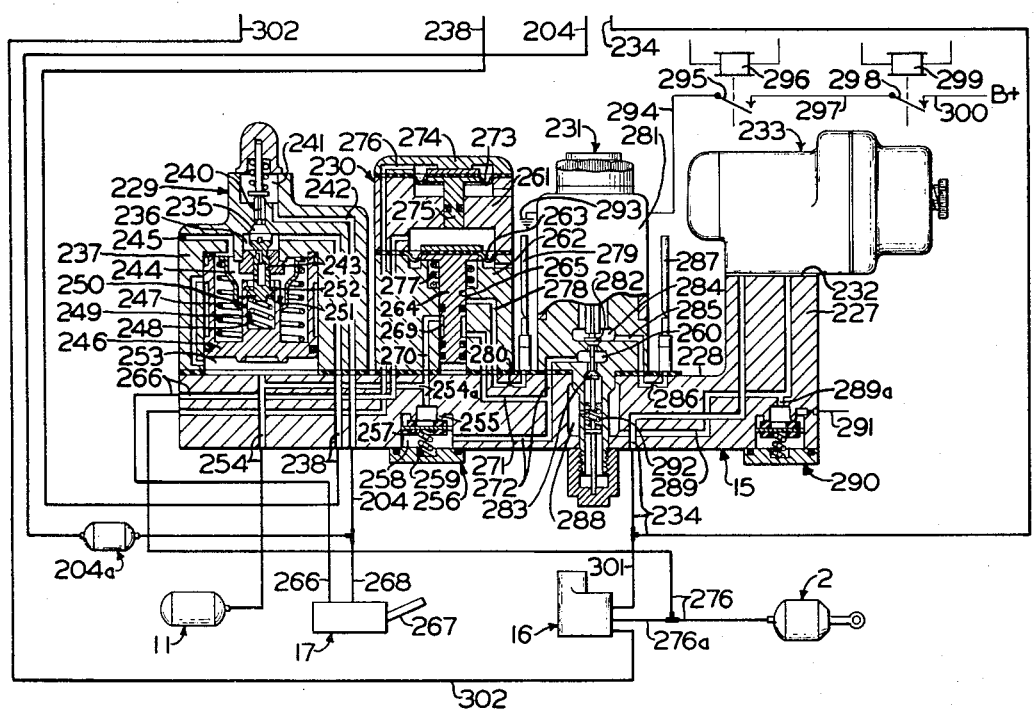

FIGS. 1A, 1B, 1C and 1D when taken together such that the lower edge of FIG. 1A is matched with the upper edge of FIG. 1B, the lower edge of FIG. 1B is matched with the upper edge of FIG. 1C, and the right-hand face of FIG. 1D abuts a boss formed on the left-hand side of the left-hand end cover shown in FIG. 1A, constitute a diagrammatic view of a brake apparatus embodying the invention.

Figure 2:
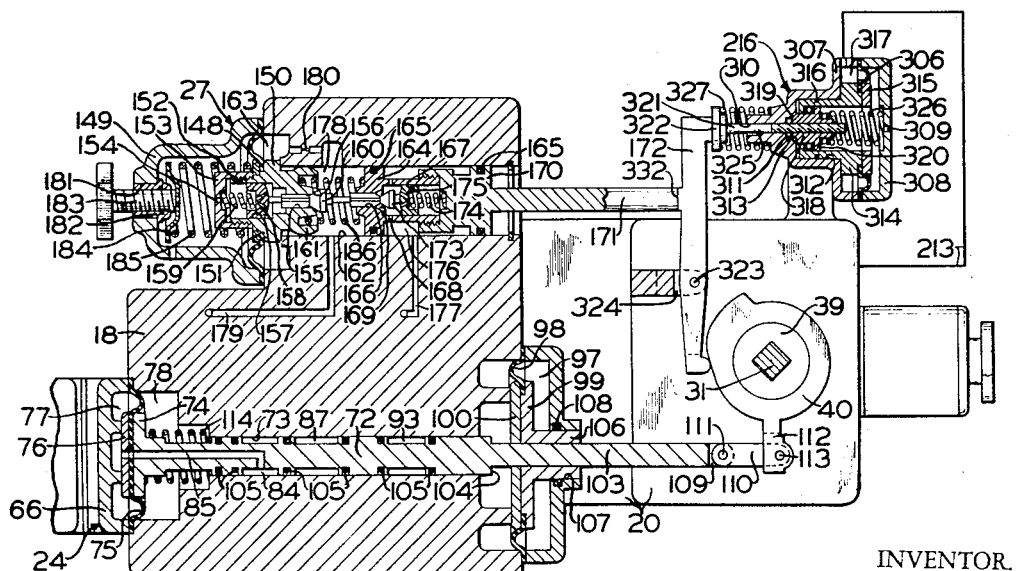

FIG. 2 is a horizontal cross-sectional view of the brake valve device shown in FIG. 1A, taken along the line 2—2 and looking in the direction of the arrows, showing the mechanical construction of a mechanism including a clutch for controlling the operation of a regulating valve device by a penalty and split reduction valve device, each comprising a part of this brake valve device, this mechanical construction not being shown in FIG. 1A.

Referring to the drawings, a railway fluid pressure brake control system embodying the invention comprises on the locomotive a brake pipe (FIG. 1B) that extends from the locomotive back through each car in a train, a brake cylinder 2 (FIG. 1C), a main reservoir 3 (FIG. 1B), an auxiliary reservoir 4, a control reservoir 5, a selector volume reservoir 6, a volume reservoir 7, a suppression reservoir 8, a split reduction reservoir 9, a stop reservoir 10, a timing volume 11 (FIG. 1C), an engineer's automatic brake valve 12 (FIG. 1A) for controlling the pressure in the brake pipe 1, an independent brake valve 13 (FIG. 1B) for applying the releasing the fluid pressure brakes on the locomotive independently of those on the connected cars in a train, a brake control valve 14 connected to the brake pipe 1 and controlled by variations in pressure therein, a penalty control magnet valve device 15 (FIG. 1C), a relay valve 16, and a safety control or foot valve device 17.

The engineer's automatic brake valve 12 (FIG. 1A) comprises a sectionalized casing having a first casing section 18 that is secured to the upper end of a pipe bracket 19 (FIG. 1B) by any suitable means (not shown), a second casing section 20 (FIG. 1A) secured to the right-hand side of the first casing section 18, and a third casing section 21 secured to the right-hand side of the second casing 20, a sealing gasket being interposed between each pair of adjacent casing sections and between the first casing section 18 and the pipe bracket 19.

As shown in FIG. 1A, the first casing section 18 contains a relay valve device 22, a brake pipe cut-off valve device 23, a penalty and split reduction valve device 24, a suppression valve device 25, a vent valve device 26 and a self-lapping control valve device 27.

The third casing section 21, as shown in FIG. 1A, contains a novel manually positionable selector valve device 28 for selectively conditioning the brake valve device 12 for effecting either direct release operation of the brake control valve on each car in a train of cars hauled by a locomotive provided with the engineer's automatic brake valve 12, if each car is provided with a direct release type brake control valve device, or a graduated application and graduated release operation of the brake control valve device on each car if each car is provided with a graduated release type brake control valve device, for cutting out control of brake pipe pressure by the brake valve 12 for multiple unit or trailing (pusher) unit operation, for conducting a brake pipe leakage test, or for cutting out a split reduction service brake application.

Operation of the suppression valve device 25 and the vent valve device 26 is controlled respectively by a pair of cams 29 and 30, each of which is provided with a square hole (not shown). A square cam shaft 31 extends through these cams 29 and 30, there being a first spacer element 32 having a square hole therein mounted on the cam shaft 31 and interposed between these cams. A second spacer element 33 also having a square hole therein is mounted on this shaft 31 between the cam 30 and a flat surface 34 formed on the casing section 20. The lower end of the cam shaft 31 is provided with a cylindrical portion 35 that is rotatably mounted in a bottomed bore 36 provided in the casing section 20.

A third spacer element 37 having a square hole therein is mounted on the cam shaft 31 above the cam 29 and extends upward through a bore 38 in the casing section 20 to the exterior thereof. The upper end of the spacer element 37 is provided with a cylindrical portion 39 on which is mounted with a turning fit a penalty cam 40 that is operatively connected to the penalty and split reduction valve device 24 in a manner hereinafter described whereby operation of this valve device 24 effects rotation of this cam 40 relative to the spacer 37 and cam shaft 31.

The cam shaft 31 extends above the penalty cam 40 to receive thereon a service cam 41 that is provided with a square hole so that this cam 41 is rotatably with the cam shaft 31 that has secured to its upper end a manually movable brake valve handle 42.

The relay valve device 22 comprises a diaphragm-type piston 43 (FIG. 1A), which is subject opposingly to fluid pressure in a chamber 44 and a chamber 45 and is adapted through the medium of a coaxially arranged operating stem 46 to effect unseating of a disc-shaped exhaust valve 47 carried by an annular valve member 48 or to effect unseating of a disc-shaped supply valve 49 carried by a coaxially arranged annular valve member 50, according to whether the pressure in chamber 44 is less than or exceeds the pressure in chamber 45. The operating stem 46 is coaxially connected to the chamber 45 side of the diaphragm-type piston 43 and projects centrally through the annular valve member 48 and a chamber 51 and is adapted to be moved into abutting relationship with the left-hand face of the supply valve 49. Springs 52 and 53 respectively urge the valve members 48 and 50 towards each other for normally concurrently seating the exhaust valve 47 and the supply valve 49. The exhaust valve 47 controls communication between the chamber 51 and a chamber 54 which is connected by a passageway 55 to a suppression valve portion 56 (FIG. 1B) the construction and operation of which is the same as that of the suppression valve portion 62 shown in detail in FIG. 2 of U.S. Pat. No. 3,076,681, issued Feb. 5, 1963 to Erik G. Erson and Robert J. Worbois and assigned to the assignee of the present application except the piston-type charging valve 164 of the suppression valve portion 62 of U.S. Pat. No. 3,076,681 has been omitted from the suppression valve portion 56 of the present invention. It will be noted, however, that the suppression valve device 25 controls the flow of fluid under pressure from the brake pipe to this suppression valve portion 56 in the same manner as the charging valve 164 shown in U.S. Pat. No. 3,076,681. Accordingly, such a charging valve is not necessary in the suppression valve portion 56 of the present application.

The supply valve 49 controls communication between the chamber 51 and a chamber 57 that is always open via a passageway and corresponding pipe 58 to the main reservoir 3 (FIG. 1B).

The chamber 51 (FIG. 1A) is connected via a passageway 59 to a chamber 60 in the hereinbefore-mentioned brake pipe cut-off valve device 23.

The brake pipe cut-off valve device 23 comprises an annular cut-off valve 61 that is disposed in a chamber 62 that is open to the brake pipe 1 via a passageway 63 and a correspondingly numbered pipe and controls communication between the chamber 62 and the chamber 60 into which opens the hereinbefore-mentioned passageway 59. Valve 61 is movably carried within an annular member 64 that is axially shiftable in a bore 65 provided in the casing section 18. Interposed between the annular member 64 and a cover member 66 secured to the left-hand side of the casing section 18 by any suitable means (not shown) is a spring 67 which is normally effective to bias the annular member 64 into contact with a shoulder on the casing 18 at the left-hand end of the bore 65. A spring 68 is interposed between the cut-off valve 61 and the annular valve member 64 and acts to normally bias the valve 61 against an annular valve seat 69 to close communication between chambers 60 and 62. When the relay valve device 22 operates to supply fluid under pressure to chamber 51, this fluid flows via passageway 59 to the chamber 60 where it will first unseat valve 61 and then expose the whole area of the annular member 64 to this pressure for shifting this member against the resistance of the spring 67 to a position in which the annular member 64, through the medium of a snap ring 70, holds the valve 61 unseated. While valve 61 is thus held unseated, fluid under pressure flows from the chamber 51 in the relay valve device 22 to the brake pipe 1 via passageway 59, chambers 60 and 62 and passageway and pipe 63. Fluid under pressure may be supplied to a chamber 71 at the left-hand side of the annular member 64 in a manner hereinafter described to seat valve 61 on its seat 69 to cut off flow of fluid under pressure from the relay valve device 22 to the brake pipe 1.

The penalty and split reduction valve device 24 comprises a spool-type valve 72 (FIGS. 1A and 2) that is slidably disposed in a bore 73 provided in the casing section 18 and has a diaphragm follower 74 formed integral with its left-hand end. The central portion of a diaphragm 75 is clamped between the diaphragm follower 74 and a diaphragm follower plate 76 secured to the diaphragm follower 74 by any suitable means (not shown). The outer periphery of the diaphragm 75 is clamped between the casing section 18 and the cover member 66.

The diaphragm 75 cooperates with the casing section 18 and the cover member 66 to form on the respective opposite sides of the diaphragm a pair of chambers 77 and 78, it being noted that the left-hand end of the bore 73 opens into the chamber 78. The chamber 77 is constantly supplied with fluid under pressure from the main reservoir 3 via the pipe and passageway 58 and a passageway 79, one end of which opens into the passageway 58 intermediate the ends thereof and the other end into the chamber 77. The chamber 78 is constantly open to the passageway 79 via a passageway 80 having a choke 81 therein. As shown in FIG. 1A, one end of a passageway 82 opens into the passageway 80 on the right-hand side of the choke 81. This passageway 82 extends through the casing sections 18, 20 and 21 and opens at its other end at the wall surface of a bore 83 provided in the casing section 21.

The chamber 77 is constantly in communication with a first elongated peripheral annular groove 84 formed on the spool valve 72 via a passageway 85 that extends longitudinally through the diaphragm follower plate 76, diaphragm follower 74 and a portion of the spool valve 72 and at its right-hand end extends crosswise so as to open at the peripheral surface of this groove 84 which, while the valve 72 occupies the position shown in FIGS. 1A and 2, is ineffective to establish a communication with a lock-over passageway 86, one end of which opens at the wall surface of the bore 73.

While the spool valve 72 occupies the position shown in FIGS. 1A and 2 of the drawings, a second elongated peripheral annular groove 87 thereon is effective to establish a communication between the above-mentioned one end of the passageway 86 and one end of an exhaust passageway 88 that opens in spaced-apart relationship at the wall surface of the bore 73.

The passageway 86 extends through the casing section 18 and pipe bracket 19 and is connected by a correspondingly numbered pipe to one end of a double check valve device 89 (FIG. 1B) the side outlet of which is connected by a pipe 90 having a brach pipe 90a to a dynamic brake cut-out switch 91 and a power cut-off switch 92, as shown in FIG. 1B of the drawings.

Furthermore, while the spool valve 72 occupies the position shown in FIG. 1A, a third elongated peripheral annular groove 93 thereon is effective to establish a communication between a pair of passageways 94 and 95 that at one end open in spaced-apart relationship at the wall surface of the bore 73 on the right-hand side of the opening of the passageway 88 at this wall surface.

The passageway 94 extends through the casing section 18 to the suppression valve device 25 hereinafter described in detail. The passageway 95 extends through the casing section 18 and a cover member 96 to a chamber 97 formed by the cooperative relationship of this cover member and a diaphragm 98, the outer periphery of which is clamped between this cover member and the casing section 18 to which the cover member is secured by any suitable means (not shown).

The inner periphery of the diaphragm 98 is clamped between two annular diaphragm follower plates 99 and 100 secured together by any suitable means (not shown). This diaphragm 98 cooperates with the casing section 18 to form on its left-hand side a chamber 101 that is constantly open to atmosphere via a passageway 102 provided in the casing section 18.

Integral with the right-hand end of the spool valve 72 is an operating stem 103 that forms a shoulder 104 at its left-hand end. This stem 103 extends with a sliding fit through the annular diaphragm follower plates 99 and 100 to the exterior of the casing section 18.

In order to prevent leakage of fluid under pressure along the bore 73 from one of the elongated peripheral annular grooves on the spool valve 72 to another and from one to another of the passageways opening at the wall surface of the bore 73, the spool valve 72 is provided with six spaced-apart peripheral annular grooves in each of which is carried an O-ring 105 that forms a seal with the wall surface of the bore 73. Furthermore, in order to prevent leakage of fluid under pressure from the chamber 97 to atmosphere, an annular boss 106 that is integral with the diaphragm follower plate 99 and extends through a bore 107 provided in the cover member 96 is surrounded by an O-ring 108 that is carried in a groove formed in the wall surface of the bore 107 and forms a seal with the periphery of this annular boss 106.

As shown in FIG. 2, the right-hand end of the operating stem 103 is provided with a clevis 109 between the jaws of which is disposed the left-hand end of a link 110 that is operatively connected to this stem 103 by a pin 111 that extends through a bore in this link and has its opposite ends anchored in the jaws of this clevis 109. The right-hand end of the link 110 is disposed between the jaws of a clevis 112 that is formed integral with the hereinbefore-mentioned penalty cam 40 and is operatively connected thereto by a pin 113 that extends through a bore adjacent the right-hand end of the link 110 and has its opposite ends anchored in the jaws of the vlevis 112. Accordingly, movement of the spool valve 72 in the direction of the right hand against the yielding resistance of a spring 114 disposed in the chamber 78 in surrounding relation to the spool valve 72 and interposed between the diaphragm follower 74 and the casing section 18 is effective to rotate the penalty cam 40 counterclockwise, as viewed in FIG. 2, about the cylindrical portion 39 of spacer element 37 (FIG. 1A).

The suppression valve device 25 comprises a spool-type suppression valve 115 that is slidably disposed in a horizontal bore 116 formed in the casing section 18 and is constantly biased into contact with the hereinbefore-mentioned cam 29 by a spring 117 interposed between its left-hand end and the cover member 66 that closes the left-hand end of the bore 116. The cover member 66 cooperates with the casing section 18 to form at the left-hand end of the suppression valve 115 a chamber 118 that is in constant communication with the main reservoir 3 (FIG. 1B) via a short passageway 119 that opens at one end at the wall surface of the bore 116 adjacent its left-hand end and at its opposite end into the passageway 79 intermediate the ends thereof, the passageway 79 and the passageway and pipe 58.

The contour of the cam 29 carried on the cam shaft 31 is such that the suppression valve 115 is moved to its release position in the bore 116 in which it is shown in FIG. 1A upon manual movement of the brake valve handle 42 to its release position. It should be understood that the suppression valve 115 is operatively shifted by rotation of the cam shaft 31 and cam 29 to its additional positions of service, suppression, handle off and emergency, upon manual arcuate movement of the handle 42 to its corresponding positions.

As shown in FIG. 1A, the other end of the hereinbefore-mentioned passageway 94 opens at the wall surface of the bore 116. Accordingly, while the suppression valve 115 is maintained in the position shown by the cam 29, which position corresponds to the release position of the brake valve handle 42, a first elongated peripheral annular groove 120 thereon establishes a communication between that end of a passageway 121 provided in the suppression valve 115 that opens at the peripheral surface of this groove 120 and that end of a passageway 122 provided in the casing section 18 that opens at the wall surface of the bore 116 therein at such a location intermediate the ends of this bore as to be in alignment with this groove 120. The other end of the passageway 121 opens into the bore 116 at the surface of a portion of reduced diameter of the suppression valve 115, it being noted from FIG. 1A that the right-hand end of this bore 116 opens into a chamber 123 in the casing section 20 which chamber is open to atmosphere via a passageway 124 in the casing section 20.

The above-mentioned passageway 122 extends through the casing section 18 and the cover member 66 to the hereinbefore-mentioned suppression valve portion 56 (FIG. 1D).

Furthermore, the suppression valve 115 is provided with a second elongated peripheral annular groove 125 which, when the suppression valve 115 is shifted to its suppression, handle-off and emergency positions, establishes a communication between a branch passageway 79a of the hereinbefore-mentioned passageway 79 and the above-mentioned passageway 122 in order that fluid under pressure may be supplied from the main reservois 3 to the passageway 122 in these positions of the suppression valve 115.

Moreover, the suppression valve 115 is provided with a third elongated peripheral annular groove 126 which, while the suppression valve 115 occupies the position shown in FIG. 1A, establishes a communication between a branch passageway 121a of the hereinbefore-mentioned passageway 121 in the suppression valve 115 and that end of a passageway 127 in the casing section 18 that opens at the wall surface of the bore 116. The other end of the passageway 127 opens at the wall surface of the bore 73 in which the spool valve 72 is slidably mounted, it being noted that, while the valve 72 occupies the position shown, the two O-rings 105 carried by the valve 72 adjacent its left-hand end are disposed on the respective opposite sides of the location at which this end of the passageway 127 opens at the wall surface of the bore 73. These two O-rings 105, while the spool valve 72 remains in the position shown, form a seal with the wall surface of the bore 73 to prevent the flow of fluid under pressure from the chambers 77 and 78 to the passageway 127.

Finally, the suppression valve 115 is provided with a fourth elongated peripheral annular groove 128 which, while the suppression valve 115 occupies the position shown in FIG. 1A, establishes a communication between that end of the hereinbefore-mentioned passageway 94 that opens at the wall surface of the bore 116 and that end of a passageway 129 in the casing section 18 that opens at the wall surface of the bore 116 on the right-hand side of the opening of the passageway 94 at this wall surface. The passageway 129 extends through the casing section 18 and the cover member 66 to the hereinbefore-mentioned suppression valve portion 56 (FIG. 1D).

The vent valve device 26 comprises an annular vent valve 130 that is disposed in a chamber 131 formed in the casing section 18 intermediate the ends of the passageway 63 that extends through this casing section. The vent valve 130 establishes a communication between the chamber 131 and atmosphere when unseated from an annular valve seat 132 against which is is normally seated by a spring 133 interposed between the vent valve 130 and a vent valve cage 134 that is disposed in a bore 135 provided in the casing section 18 and abuts a stop 136 formed integral with the cover member 66.

Slidably mounted in a bore 137 provided in the casing section 18 is a spool-type valve 138 that has extending from its respective opposite ends stems 139 and 140, the stem 139 extending in the direction of the vent valve 130 and the outer end of the stem 140 abutting the cam 30. Consequently, the contour of the cam 30 is such tat the rotation thereof and the cam shaft 31 upon manual movement of the brake valve handle 42 to its emergency position effects movement of the spool valve 138 in the direction of the left hand, as viewed in FIG. 1A, whereupon the stem 139 unseats the vent valve 130 from its seat 132. It will be understood that the contour of the cam 30 is such that the vent valve 130 is unseated only when the handle 42 is moved to its emergency position and remains seated in all other positions of this handle.

Formed on the spool valve 138 intermediate the ends thereof is an elongated peripheral annular groove 141. When this valve 138 is moved to its emergency position against the yielding resistance of a spring 142 that is disposed about the valve 138 and interposed between a collar 143 on the valve 138 and a shoulder 144 formed at the left-hand end of a counterbore 145 coaxial with the bore 137, the groove 141 thereon is effective to establish a communication between that end of a pair of passageways 146 and 147 that at one end open in spaced-apart relationship at the wall surface of the bore 137.

The passageway 146 extends through the casing section 18 and pipe bracket 19 (FIG. 1B) and is connected by a correspondingly numbered pipe to the other end of the hereinbefore-mentioned double check valve device 89. The passageway 147 extends through the casing section 18 and pipe bracket 19 and is connected to the hereinbefore-mentioned passageway 58 which is constantly supplied with fluid under pressure from the main reservoir 3. Consequently, when the brake valve handle 42 is moved to its emergency position, the spool valve 138 is moved in the direction of the left hand, as viewed in FIG. 1A, to a position in which the stem 139 unseats vent valve 130 from its seat 132 to vent fluid under pressure from the brake pipe 1 to atmosphere at an emergency rate and the groove 141 on this spool valve 138 establishes a communication between passageways 146 and 147 whereupon fluid under pressure flows from the main reservoir 3 to the dynamic brake cut-out switch 91 and the power cut-off switch 92 thereby cutting out the dynamic brake and reducing the speed of the diesel engines on the locomotive to idling speed.

The self-lapping control valve device 27, the details of construction of which are shown in FIG. 2, comprises a diaphragm 148 the outer periphery of which is clamped between the casing section 18 and a ported cover 149 secured thereto by any suitable means (not shown).

The inner periphery of the diaphragm 148 is clamped between a combined diaphragm follower and exhaust seat member 150 and an annular diaphragm plate 151 through which a screw-threaded stem 152 integral with the exhaust valve seat member 150 extends to receive a screw-threaded nut 153 which is tightened against the diaphragm plate 151 and is in the form of a cup having a bore 154 in the bottom thereof.

The above-mentioned combined diaphragm follower and exhaust valve seat member 150 of the self-lapping control valve device 27 is provided with a bore 155 having an annular exhaust valve seat 156 formed at its right-hand end. Coaxial with the bore 155 is a counterbore 157 that has slidably mounted therein a ported spring seat 158 between which and the left-hand end of the nut 153 is a spring 159 which is effective via the spring seat 158 to bias an exhaust valve 160 in the direction away from its seat 156.

The combined diaphragm follower and exhaust valve seat member 150 is provided on its right-hand end with a cylindrical skirt portion 161 that is slidably guided in a bore 162 provided in the casing section 18. The left-hand end of the bore 162 opens into a chamber 163 formed by the cooperative relationship of the diaphragm 148 and the main casing section 18.

Sealingly and slidably mounted in the bore 162 on the right-hand side of the skirt portion 161 therein is a supply valve seat piston member 164 that is provided with a peripheral annular groove in which is disposed an O-ring 165 that forms a seal with the wall surface of the bore 162 to prevent flow of fluid under pressure from each side of the piston member 164 to the other. This piston member 164 is also provided with a bore 166, a coaxial counterbore 167 and a cross-bore 168 which, as shown in FIG. 2, is located at the left-hand end of the counterbore 167. The supply valve seat piston member 164 has a supply valve seat 169 formed at the right-hand end of the bore 166. Furthermore, the right-hand end of the supply valve seat piston member 164 is provided with external screw threads which have screw-threaded engagement with corresponding internal screw threads formed on the interior of a cup-shaped piston member 170 that is slidably mounted in the bore 162. Piston member 170 is provided with a stem 171 which extends through the bore 162 to the exterior of the casing section 18 and at its outer end abuts a lever 172 hereinafter described. This piston member 170 is also provided with a peripheral annular groove in which is disposed a second O-ring 165 that forms a seal with the wall surface of the bore 162, the right-hand end of which is open to atmosphere.

Disposed in the counterbore 167 is a poppet-type supply valve 173 which is biased in the direction of its valve seat 169 by a spring 174 that is interposed between the piston member 170 and a spring seat 175 that abuts the valve 173.

It can be seen from FIG. 2 that the cup-shaped piston member 170 cooperates with the supply valve seat piston member 164 and with the wall surface of the bore 162 to form a chamber 176 which is open to the interior of the counterbore 167 via the cross-bore 168. Opening into this chamber 176 is one end of a passageway 177 which extends through the casing section 18 and, as shown in FIG. 1A of the drawings, opens at its opposite end into the hereinbefore-mentioned passageway 58 which, as aforestated, is connected by the correspondingly numbered pipe to the main reservoir 3. Consequently, fluid under pressure from the main reservoir 3 is always present in the chamber 176 and the interior of the counterbore 167.

As shown in FIG. 2 of the drawings, the poppet-type supply valve 173 is provided with a fluted stem that extends through the bore 166 and into bore 162 where it abuts the exhaust valve 160 which in turn is provided with a fluted stem that extends through the bore 155 and abuts the right-hand end of the spring seat 158.

It can be seen from FIG. 2 that the supply valve seat piston member 164 cooperates with the cylindrical skirt portion 161 of the combined diaphragm follower and exhaust valve seat member 150 and with the wall surface of the bore 162 to form a delivery chamber 178. Opening into the delivery chamber 178 is one end of a passageway 179 that extends through the casing section 18 and, as shown in FIG. 1A, opens at its opposite end into the hereinbefore-mentioned chamber 44 in the relay valve device 22. The delivery chamber 178 is also connected to the chamber 163 on the right-hand side of the diaphragm 148 via a choke 180. It will be seen from FIG. 2 that the cover member 149 is provided with a bore 181 into which is press-fitted a flanged plug 182 that has a screw-threaded bore for receiving a screw-threaded adjusting screw 183 on the right-hand end of which is a portion of reduced diameter that extends through a bore formed in a cup-shaped spring seat 184. A regulating spring 185 is interposed between the spring seat 184 and the diaphragm plate 151, and a spring 186 is interposed between the skirt portion 161 of the combined diaphragm follower and exhaust valve seat member 150 and the left-hand end of the supply valve seat piston member 164.

The regulating spring 185 of the self-lapping control valve device 27 may be manually adjusted by means of the adjusting screw 183 so that this control valve device 27 will provide in its delivery chamber 178 a desired normal pressure, which, for example, may be seventy pounds per square inch. Since the delivery chamber 178 in the control valve device 27 is connected to the chamber 44 in the relay valve device 22 by the passageway 179, it will be understood that fluid under pressure will fow from the chamber 178 to the chamber 44 to cause operation of the relay valve device 22 to charge the brake pipe to this pressure.

As shown in FIG. 1A, the selector valve device 28 comprises a spool-type selector valve 187 that is sealingly slidable in the hereinbefore-mentioned bore 83 in casing section 21. This spool valve 187 has adjacent its upper end a transversely extending notch into which extends a dog 188 that is eccentrically carried by a rotatable member 189. The selector valve 187 may be shifted in the bore 183 to any one of three positions by first pushing inward a handle 190 against the yielding resistance of a spring 191 to disengage a pin 192 from a position-defining-notch and thus unlock the handle so that it may be thereafter rotated to thereby, through the engagement of the pin 191 with the rotatable member 189, move the spool valve 187 to another one of its positions in which the pin 192 can be spring-biased into another position-defining-notch.

The selector valve 187 has six spaced-apart elongated peripheral annular grooves 193, 194, 195, 196, 197 and 198 formed thereon. On the land between the elongated peripheral annular grooves 193 and 194, the selector valve 187 is provided with a pair of spaced-apart peripheral annular grooves in each of which is disposed an O-ring 199. Furthermore, on the lands between the elongated peripheral annular grooves 194, 195, 196, 197 and 198, and also adjacent the upper end of the elongated groove 193 and the lower end of the elongated groove 198, the selector valve 197 has formed thereon respective peripheral annular grooves in each of which is disposed an O-ring 199.

The elongated peripheral annular groove 195 is connected by a choke 200 to a passageway 201 extending through the selector valve 187, one end of which opens at the lower end thereof and the other end of which opens into the bore 83 at the peripheral surface of this valve above the upper O-ring 199 carried thereby and, while the selector valve 187 occupies the position shown in FIG. 1A, below that end of a passageway 202 in the casing section 21, which end opens at the wall surface of the bore 83 in this casing section. The passageway 202 extends through the casing sections 21 and 20 and at its other end opens into the chamber 123 which is open to atmosphere, as hereinbefore stated.

While the selector valve 187 occupies the position shown in FIG. 1A, one end of a passageway 203 in the casing section 21 opens at the wall surface of the bore 83 intermediate the ends of the elongated peripheral annular groove 195 on this valve 187. The passageway 203 extends through the casing sections 21, 20 and 18 and the cover member 66 and at its other end opens into the chamber 71 in the brake pipe cut-off valve device 23. Therefore, while the selector valve 187 occupies the position shown in FIG. 1A, the chamber 71 in the brake pipe cut-off valve device 23 is open to atmosphere via the passageway 203, groove 195, choke 200, passageway 201, bore 83, passageway 202, chamber 123 and passageway 124.

Furthermore, while the selector valve 187 occupies the position shown in FIG. 1A, the uppermost groove 193 thereon establishes a communication between that end of the hereinbefore-mentioned passageway 82 that opens at the wall surface of the bore 83 and one end of a passageway 204 that opens at the wall surface of this bore below the location at which the end of the passageway 82 opens at this wall surface. The passageway 204 extends through the casing sections 21, 20 and 18, and the pipe bracket 19 (FIG. 1B) and is connected by a correspondingly numbered pipe to the penalty control magnet valve device 15 (FIG. 1C) which is hereinafter described in detail. A timing reservoir 204a is disposed in the pipe 204 to prevent (1) a train control application while a locomotive is passing from one main track to another via a cross-over track, and (2) a safety control brake application upon effecting an independent brake release subsequent to effecting an independent brake application and the engineer removing his foot from the pedal of the foot valve device 17. As shown in FIG. 1B, the passageway 204 has a branch passageway 204b that is connected by a correspondingly numbered pipe to a duplex pressure gage 205, one indicating hand of which indicates to the engineer of a train the pressure of fluid in the passageway and pipe 204.

Moreover, while the selector valve 187 occupies the position shown in FIG. 1A, the groove 194 thereon establishes a communication between that end of a pair of passageways 206 and 207 that open in vertical spaced-apart relation at the wall surface of the bore 83. The passageway 206 extends through the casing sections 21, 20 and 18 and opens at its other end into the hereinbefore-mentioned passageway 85 intermediate the ends thereof. The passageway 207 extends through the casing sections 21, 20 and 18, and the pipe bracket 19 and is connected by a correspondingly numbered pipe to the hereinbefore-mentioned split reduction reservoir 9.

During the time that the selector valve 187 occupies the position shown in FIG. 1A, the groove 196 thereon connects that end of a pair of passageways 208 and 209 that open in vertical spaced-apart relation at the wall surface of the bore 83. The passageway 208 extends through the casing sections 21 and 20 and opens into the passageway 209 which also extends through these casing sections and has its other end opening into an outlet chamber 210 of a check valve device 211 hereinafter described in detail.

Also, while the selector valve 187 remains in the position shown in FIG. 1A, the O-rings 199 adjacent the respective opposite ends of the groove 197 thereon form a seal with the wall surface of the bore 83 to prevent flow of fluid under pressure from that end of a passageway 212 that opens at the wall surface of this bore to either the passageway 209 or that end of a passageway 213 that opens at the wall surface of this bore at a location that is below the location at which the end of the passageway 212 opens at this wall surface. This passageway 212 extends through the casing sections 21 and 21 and has its opposite end opening into an outlet chamber 214 of a second check valve device 215 hereinafter described in detail. The passageway 213 extends through the casing sections 21 and 20 and is connected by a correspondingly numbered pipe to a novel clutch mechanism 216 (FIG. 2) hereinafter described in detail.

Finally, while the selector valve 187 occupies the position shown in FIG. 1A, the lowermost groove 198 thereon establishes a communication between that end of the passageway 213 that opens at the wall surface of the bore 83 and one end of a passageway 217 that opens at the wall surface of this bore below the location at which the end of the passageway 213 opens at this wall surface. This passageway 217 extends through the casing sections 21, 20 and 18 and at its other end opens into the chamber 118 at the wall surface of the bore 116 in the suppression valve device 25 at a location that is at the left-hand end of the suppression valve 115 while it occupies the position shown. The chamber 118 is in constant communication with the main reservoir 3 (FIG. 1B) as hereinbefore stated. Therefore, while the suppression valve 115 remains in the position shown, fluid at the pressure carried in the main reservoir will flow from the chamber 118 to the clutch mechanism 216 via the passageway 217, groove 198 and passageway and pipe 213 to effect operation of this clutch mechanism 216 in a manner hereinafter described.

Disposed in the outlet chamber 210 of the above-mentioned check valve device 211 is a flat disc-type check valve 218 that is normally biased against an annular valve seat 219 by a spring 220 to prevent flow of fluid under pressure to the outlet chamber 210 from a passageway 221, one end of which opens within the annular valve seat 219. This passageway 221 has a choke 222 therein and extends through the casing sections 20 and 18 and opens at its opposite end into the hereinbefore-mentioned passageway 63 which is connected to the brake pipe 1 as afore-stated. Consequently, when a locomotive provided with the engineer's brake valve 12 is hauled dead in a train and the selector valve 187 is manually moved to its cut-out position in which the groove 196 thereon establishes a communication between the passageways 208 and 203, fluid under pressure will flow from the train brake pipe to the chamber 71 in the brake pipe cut-off valve device 23 via pipe and passageway 63, passageway 221, choke 222, past check valve 218, chamber 210, passageways 209 and 208, groove 196 and passageway 203 to cause annular member 64 and cut-off valve 61 to be moved in the direction of the right hand to seat valve 61 on its seat 69 thereby closing communication between the chambers 60 and 62 to prevent relay valve device 22 of the brake valve 12 on the dead locomotive from operating to vent fluid under pressure from the train brake pipe to atmosphere.

Likewise, disposed in the outlet chamber 214 of the above-mentioned check valve device 215 is a flat disc-type check valve 223 that is normally biased against an annular valve seat 224 by a spring 225 to prevent flow of fluid under pressure to the outlet chamber 214 from a passageway 226, one end of which opens within the annular valve seat 224. This passageway 226 extends through the casing sections 20 and 18 and opens at its opposite end into the hereinbefore-mentioned passageway 58 which is connected to the main reservoir 3 (FIG. 1B), as aforestated. Accordingly, when the locomotive provided with the brake valve 12 is a trailing locomotive (pusher) in the train and the selector 187 is manually moved to its cut-out position in which the groove 196 thereon establishes a communication between the passageways 208 and 203, fluid under pressure will flow from the main reservoir 3 on this trailing locomotive to the chamber 71 in the brake pipe cut-off valve device 23 via pipe and passageway 58, passageway 226, past check valve 223, chamber 214, passageway 212, groove 197, passageways 209 and 208, groove 196, and passageway 203 to cause seating of the valve 61 on its seat 69 in the manner explained above to present venting of fluid under pressure from the train brake pipe to atmosphere.

The construction and operation of the independent brake valve 13 (FIG. 1B) may be the same as that of the independent brake valve 5 shown and described in U.S. Pat. No. 2,958,561, issued Nov. 1, 1960 to Harry C. May and assigned to the assignee of the present invention, and since this brake valve device 13 forms no part of the present invention, a further description thereof is deemed unnecessary.

The construction and operation of the brake control valve 14 (FIG. 1B) may be the same as that of the brake control valve 3 shown and described in U.S. Pat. No. 2,937,906, issued May 24, 1960 to Harry C. May and assigned to the assignee of the present invention, and since this control valve 14 forms no part of the present invention, a further description is believed to be unnecessary.

The penalty control magnet valve device 15 (FIG. 1C) comprises a pipe bracket 227 that has a first bolting face 228 to which is secured a timing valve device 229, a safety control valve device 230, and a magnet valve device 231, and a second bolting face 232 to which is secured a reducing valve device 233 which may be of any well-known construction, the purpose of this reducing valve device being to supply fluid under pressure to the timing valve device 229 at a desired pressure less than the pressure carried in the main reservoir 3. Accordingly, an inlet port of the reducing valve device 233 is connected by a passageway and correspondingly numbered pipe 234 to the hereinbefore-mentioned pipe 58 (FIG. 1A) intermediate the ends thereof, it being remembered that the pipe 58 is connected to the main reservoir 3.

The timing valve device 229 (FIG. 1C) comprises a double beat valve 235 contained in a chamber 236 formed in a casing 237 secured to the bolting face 228 of the pipe bracket 227 by any suitable means (not shown). The chamber 236 is connected by a passageway and correspondingly numbered pipe 238 to a passageway 239 (FIG. 1B) that extends through the pipe bracket 19, casing section 18 (FIG. 1A) and cover member 66 to the hereinbefore-mentioned suppression valve portion 56 (FIG. 1D). The valve 235 is provided with a fluted stem 240 which extends into a chamber 241 also formed in the casing 237, which chamber 241 is connected by a passageway 242 to the hereinbefore-mentioned pipe 204. The valve 235 also has a hollow stem 243 extending in the opposite direction into a chamber 244 in the casing 237 which chamber 244 is open to atmosphere through a vent passageway 245.

The chamber 244 is provided at one side of a valve piston 246 which is subject to the biasing force of a spring 247 and which is operatively connected through a resilient connection to the stem 243. This resilient connection comprises a spring 248 disposed within a counterbore 249 formed in a stem 250 that is integral with the piston 246 and interposed between the bottom of the counterbore 249 and a collar 251, which is formed on the lower end of the stem 243 and slidably mounted in the upper end of the counterbore 249. A snap ring 252 is inserted in a groove formed in the counterbore 249 and in surrounding relation to the stem 243 on the upper side of the collar 251 to complete the resilient connection between the stem 243 and the piston 246.

At the lower side of the piston 246 is a chamber 253 in constant communication with the hereinbefore-mentioned timing volume 11 through a passageway and correspondingly numbered pipe 254 which passageway is also connected by a branch passageway 254a to the inner area of an annular valve seat 255 of a one-way check valve device 256 carried by the pipe bracket 227. A flat disc-type check valve 257 disposed in an outlet chamber 258 is normally biased against the valve seat 255 by a spring 259 to prevent flow of fluid under pressure from the branch passageway 254a to the chamber 258 which is connected to a chamber 260 in magnet valve device 231, the check valve 257 being arranged to provide for flow of fluid under pressure in the direction from the chamber 253 in the timing valve device 229 to the chamber 260 in the magnet valve device 231 but to prevent flow therepast in the opposite direction.

The safety control valve device 230 comprises a pair of casing sections 261 and 262 between the adjacent ends of which is clamped the outer periphery of a diaphragm 263 the other end of the casing section 262 being secured to the bolting face 228 of the pipe bracket 227 by any suitable means (not shown). The center portion of the diaphragm 263 is clamped between a diaphragm follower integral with the upper end of a spool-type valve 264 slidably and sealably mounted in a bore 265 in the casing section 263 and a fiaphragm follower plate secured to the diaphragm follower by any suitable means (not shown).

The diaphragm 263 cooperates with the casing sections 261 and 262 to form on the respective opposite sides of this diaphragm a pair of chambers, the chamber below the diaphragm being constantly open to atmosphere and the chamber above it being connected by a passageway and correspondingly numbered pipe 266 to the foot valve device 17 that is provided with a pedal 267 which, when held depressed by the locomotive engineer, causes operation of this valve device 17 to a position in which a communication is established between the pipe 266 and one end of a pipe 268, the opposite end of which is connected to the pipe 204 intermediate the ends thereof.

So long as the pedal 267 is held depressed, fluid under pressure supplied from the main reservoir 3 to the chamber 77 (FIG. 1A) in the manner hereinbefore described will flow from this chamber 77 to the chamber above the diaphragm 263 via choke 81, passageways 80 and 82, groove 193, passageway and pipe 204, pipe 268, the foot valve device 17, and pipe and passageway 266 to maintain the spool valve 264 in the position shown in which an elongated peripheral annular groove 269 thereon establishes a communication between one end of a passageway 270 that has its opposite end connected to the branch passageway 254a intermediate the ends thereof and one end of a passageway 271 that has its opposite end opening into a passageway 272 that connects the chambers 258 and 260 intermediate the ends of this passageway 272.

The safety control valve device 230 comprises a second diaphragm 273, the outer periphery of which is secured between the upper end of the casing section 261 and a cover member 274 secured to this casing section by any suitable means (not shown). The center portion of the diaphragm 273 is clamped between a diaphragm follower that is integral with a stem 275 which is coaxial with the spool valve 264 and extends slidably and sealably through a bore in the casing section 261 into the chamber above the diaphragm 263.

The diaphragm 273 cooperates with the casing section 261 and cover member 274 to form on the respective opposite sides of this diaphragm a pair of chambers, the chamber below this diaphragm being always open to atmosphere and the chamber above it having opening thereinto one end of a passageway 276 that is connected by a correspondingly numbered pipe to the brake cylinder 2, it being noted from FIG. 1C of the drawings that a branch 276a of the pipe 276 is connected to the delivery chamber (not shown) in the relay valve 16.

As shown in FIG. 1C, a spring 277 is interposed between the casing section 262 and the diaphragm follower that is integral with the upper end of the spool valve 264 which spring 277 is effective in the absence of fluid under pressure in the chambers above the diaphragms 263 and 273 to move the spool valve 264 from the position shown to a second position in which the groove 269 thereon establishes a communication between the passageway 270 and a passageway 278 that is connected to a fluid pressure operated whistle 279 via a choke 280 disposed in this passageway. The size of this choke 280 is so selected as to provide the desired period of time between the engineer removing his foot from the pedal 267 of the foot valve device 17 and the occurrence of a safety control brake application.

The magnet valve device 231 comprises a solenoid or magnet 281 which controls operation of a pair of coaxially arranged oppositely seated poppet valves 282 and 283. The valve 282 is contained in a chamber 284 and is provided to control communication between this chamber and the chamber 260. The chamber 284 is connected by a passageway 285 having a choke 286 therein to a second fluid pressure operated whistle 287. The valve 283 is contained in a chamber 288 which is constantly supplied with fluid under pressure through a passageway 289, one end of which opens into this chamber 288 and the opposite end of which opens at the delivery port of the reducing valve device 232. A branch passageway 289a connects the passageway 289 to the inlet of a check valve device 290, the outlet of which is connected to a signal pipe 291. This valve 283 is adapted to control communication between the chambers 288 and 260. A spring 292 in the chamber 288 acts on the valve 283 to seat it and unseat the valve 282 upon deenergization of the solenoid 281.

The circuit for effecting energization and deenergization of the solenoid 281 will now be described. This solenoid comprises a coil, one end of which is connected to ground as indicated by the reference numeral 293. The other end of this coil is connected by a wire 294 to one terminal of a normally picked-up contact 295 of an overspeed relay 296 which is deenergized to effect opening of this contact 295 upon the speed of the diesel engines of the locomotive exceeding a chosen speed. While the contact 295 is in its picked-up position, it establishes a circuit between the wire 294 and one end of a wire 297 that has its other end connected to one terminal of a single contact 298 of a train control relay 299. The coil of this relay 299 is connected in a train control circuit which is energized in response favorable and deenergized in response to unfavorable track signals and thereby the existing track conditions. Accordingly, while the coil of relay 299 is energized in response to a favorable track signal, the contact 298 of this relay is in its picked-up position to establish a circuit between the wire 297 and a wire 300 connected to the positive terminal of any suitable source (not shown) of electrical power on the locomotive. From the foregoing, it is apparent that so long as the speed of the diesel engines is less than a chosen value and a favorable track signal is being received, the contacts 295 and 298 are closed to establish a power supply circuit to the solenoid 281 whereupon it is effective to seat valve 282 and unseat valve 288. Therefore, fluid under pressure will flow from the delivery port of the reducing valve device 233 to the chamber 253 below the piston 246 of the timing valve device 229 via passageway 289, chamber 288, past unseated valve 283, chamber 260, passageways 272 and 271, groove 269, passageway 270, branch passageway 254a and passageway 254 to maintain this piston 246 in the position shown and the double beat valve 235 in its upper seated position in which communication is closed between chambers 241 and 236 to prevent a penalty brake application.

The relay valve 16 has a supply port (not shown) that is connected by a pipe 301 to the pipe 234 intermediate the ends thereof, it being remembered that this pipe 234 is connected to the pipe 58 which in turn is connected to the main reservoir 3 (FIG. 1B).

Furthermore, the relay valve 16 is provided with a control port (not shown) which is connected by a pipe 302 to the side outlet of a double check valve device 303 (FIG. 1B). One end of this check valve 303 is connected to the brake cylinder port of the brake control valve 14 by a pipe 304, it being noted that the volume reservoir 7 is connected to this pipe 304 by a branch pipe 304a. The purpose of this volume reservoir 7 is to provide the proper equalization control pressure to the relay valve 16. The opposite end of the double check valve device 303 is connected by a pipe and correspondingly numbered passageway 304 to a three-position manually operated valve 305 carried by the pipe bracket 19 through which valve 305 the independent brake vlave 13 supplies fluid under pressure to the relay valve 16 to cause a brake application only on the locomotive, it being understood that this valve 305 is shown in outline since it forms no part of the present invention.

The foot valve 17 may be such as the "D" Type foot valve manufactured by the Westinghouse Air Brake Division of Westinghouse Air Brake Company, a subsidiary of American Standard Inc.

Briefly, the foot valve 17 comprises a spool-type valve movable to one position, upon the engineer depressing the pedal 267, in which a communication is established between the pipes 268 and 266, and movable by a spring (not shown), upon the engineer releasing the pedal 267, to a second position in which the above-mentioned communication is closed and a communication is established between the pipe 266 and atmosphere.

As hereinbefore stated, the suppression valve portion 56 (FIG. 1D) is substantially the same as the suppression valve portion 62 shown in U.S. Pat. No. 3,076,681. It should be noted, however, that the suppression valve 115 and the groove 128 thereon shown in FIG. 1A of the present application control the flow of fluid under pressure from the brake pipe to this suppression valve portion in the same manner as the charging valve 164 shown in U.S. Pat. No. 3,076,681. Accordingly, such a charging valve is not necessary in the suppression valve portion 56 of the present application.

As shown in FIG. 2, the clutch mechanism 216 comprises an annular diaphragm 306, the outer periphery of which is clamped between a cup-shaped casing 307 and a cover member 308 having an atmospheric port 309 therein, this cover member being secured to the casing by any suitable means (not shown). The casing 307 is provided with a bore 310 and two coaxial counterbores 311 and 312, there being an annular internal conical-shaped clutch face 313 formed therebetween. Slidably mounted in the counterbore 312 is a sleeve member 314 having an inturned flange at its left-hand end and an outturned flange at its right-hand end, the inner periphery of the annular diaphragm 306 being clamped between this outturned flange and a diaphragm follower plate 315 secured to this flange by any suitable means (not shown).

Intermediate its ends, the sleeve member 314 is provided with a peripheral annular groove in which is disposed an O-ring 316 that forms a seal with the wall surface of the counterbore 312 to prevent leakage of fluid under pressure from a chamber 317 formed by the cooperative relationship of the casing 307, diaphragm 306 and sleeve 314 and into which chamber the hereinbefore-mentioned pipe 213 opens.

As shown in FIG. 2, a clutch nut member 318 is provided at its left-hand end with an annular external conical-shaped clutch face 319 having the same angle of inclination as the internal clutch face 313. The right-hand end of nut member 318 is provided with an outturned flange 320 between which and the inturned flange on the left-hand end of the sleeve 314 is disposed a ball bearing.

The clutch nut member 318 is provided with an internal non-self-locking type of screw thread which has screw-threaded engagement with an external non-self-locking screw thread formed on a spindle 321, the left-hand end of which extends through bore 310 to the exterior of the casing 307 and is provided with a collar 322 that abuts the upper end of the hereinbefore-mentioned lever 172 which is rockably mounted intermediate its ends on a pin 323 that extends through a bore in this lever and has its opposite ends anchored in the jaws of a clevis 324 integral with the casing section 20.

The spindle 321 carries a key 325 that slides in a keyway formed in the wall surface of the bore 310 to prevent rotation of this spindle as it is moved in one direction or in an opposite direction in a manner hereinafter described.

In the absence of fluid under pressure in the chamber 317, the external clutch face 319 is biased into clutching contact with the internal clutch face 313 on the casing 307 by a spring 326 that is interposed between the cover member 308 and a ball bearing that abuts outturned flange 320 on the right-hand end of the nut member 318.

Disposed about that portion of the spindle 321 that is exterior of the casing 307 and interposed between this casing and the collar 322 is a spring 327 which is effective to move the spindle 321 in the direction of the left hand to cause rotation of the clutch nut member 318 thereon while the clutch faces 313 and 319 are disengaged.

OPERATION

Assume initially that the apparatus is void of fluid under pressure; that the magnet valve device 231 (FIG. 1C) is energized in response to a favorable track signal for establishing a communication between passageway 289, which is connected to the outlet port of reducing valve device 233 and passageway 272; that the pedal 267 of the foot valve device 17 has been depressed by the engineer; that selector valve 187 of the selector valve device 28 (FIG. 1A) is in freight position, as shown, to condition the engineer's automatic brake valve 12 to control operation of brake control valve device 7 on the locomotive and the brake control valves on the cars which valves on the cars may be of either the direct or graduated release type; and that the handle 42 of the engineer's s automatic brake valve 12 is in its release position. Under these conditions, the various components of the apparatus will be in the respective positions in which they are shown in the drawings.

INITIAL CHARGING

To initially charge the apparatus, the diesel engines are started for operating fluid compressors (not shown) to effect charging of the main reservoir 3 (FIG. 1B). Fluid under pressure thus supplied to the main reservoir 3 will flow therefrom to the inlet port of the reducing valve device 233 (FIG. 1C) via pipe 58 and pipe and passageway 234. This reducing valve 233 in turn supplies fluid at the desired pressure less than main reservoir pressure to the passageway 272 via passageway 289, chamber 288, past unseated valve 283 and chamber 260.

Fluid under pressure will also flow from the main reservoir 3 (FIG. 1B) to the chamber 77 (FIG. 1A) at the left-hand side of the diaphragm 75 of the penalty and split reduction valve device 24 via pipe and passageway 58 and passageway 79 at a substantially unrestricted rate and will also be supplied to the chamber 78 at the right-hand side of this diaphragm 75 at a restricted rate via passageway 80 and choke 81 therein. However, choke 81 is of such flow capacity that despite the more rapid rate of charging of the chamber 77, the penalty and split reduction spool valve 72 will remain in the position shown in FIG. 1A, during initial charging because the pressure in chamber 77 will not exceed the pressure in chamber 78 by an amount sufficient to overcome the bias of spring 114.

Fluid under pressure supplied through the choke 81 to the passageway 80 will also flow therefrom to the passageway and pipe 204 and timing reservoir 204a (FIG. 1C) via passageway 82 (FIG. 1A) and groove 193 on selector valve 187. Since the pedal 267 is now held depressed by the engineer, fluid under pressure will flow from the pipe 204 to the chamber above the diaphragm 263 via pipe 268, the foot valve device 17, and pipe and passageway 266. Fluid under pressure thus supplied to the upper side of diaphragm 263 is effective to deflect this diaphragm downward to move the spool valve 264 downward to the position shown in which the groove 269 thereon establishes a communication between passageways 271 and 270. Consequently, fluid under pressure supplied by the reducing valve device 233 to the passageway 272 in the manner described above will now flow to the chamber 253 and timing volume 11 via passageway 271, groove 269, passageway 270, branch passageway 254a, and passageway and pipe 254 to move the piston 246 and double beat valve 235 to an upper position in which this valve closes communication between passageway 242 to which the pipe 204 is connected and chamber 236 to which passageway and pipe 238 is connected. Consequently, fluid under pressure cannot flow from the passageway 242 and pipe 204 to the passageway and pipe 238 and thence through passageway 239 (FIGS. 1B and 1A), and suppression valve portion 56 to the stop reservoir 10 via a pathway through this valve portion 56 that is the same as that described in hereinbefore-mentioned U.S. Pat. No. 3,076,681 for the suppression valve portion 62 shown in this patent.

Fluid under pressure will also flow from the main reservoir 3 to the chamber 57 in the relay valve device 22 via pipe and passageway 58, and some of this fluid under pressure will flow from the passageway 58 to the chamber 176 (FIG. 2) in the self-lapping control valve device 27 via the passageway 177.

As hereinbefore stated, the regulating spring 185 of the control valve device 27 has been adjusted so that this valve device 27 provides in its delivery chamber 178 a desired pressure which may be, for example, seventy pounds per square inch. Consequently, fluid at this pressure will flow from the delivery chamber 178 (FIG. 2) to the chamber 44 (FIG. 1A) in the relay valve device 22 via the passageway 179. This fluid under pressure acting in the chamber 44 is effective to deflect the piston 43 in the direction of the right hand to shift the operating stem 46 in the same direction and cause unseating of the supply valve 49 from a valve seat 328.

When the supply valve 49 is thus unseated from its seat 328, fluid under pressure will flow from the main reservoir 3 to the brake pipe 1 via pipe and passageway 58, chamber 57, past unseated valve 49, chamber 51, passageway 59, chamber 60, past cut-off valve 61 which is unseated from its seat by this fluid under pressure, chamber 62, and passageway and pipe 63. As shown in FIG. 2, the passageway 59 is connected to the chamber 45 via a passageway 329 and a choke 330. Consequently, part of the fluid under pressure supplied to the passageway 59 will flow to the chamber 45 until the pressure therein is increased to substantially the value of the pressure in the chamber 44 whereupon the piston 43 will be shifted in the direction of the left-hand to a lap position in which the supply valve 49 is seated on seat 328 to cut off further flow of fluid under pressure from the main reservoir 3 to the brake pipe 1. Thus, the brake pipe 1 will be charged to a normal charged value which corresponds to the force of the spring 185 (FIG. 2) of the self-lapping control valve device 27.

It should be noted that some of the fluid under pressure supplied to the chamber 60 flows therefrom to the chamber 97 at the right-hand side of the diaphragm 98 via a branch 129a of the passageway 129, passageway 129, groove 128 on suppression valve 115, passageway 94, groove 93 on penalty and split reduction valve 72 and passageway 95.

Moreover, some of the fluid under pressure supplied to the passageway 95 flows therefrom to the split reduction reservoir 9 (FIG. 1B) via passageway 206, groove 194 on selector valve 187, and passageway and pipe 207.

From the foregoing, it is apparent that the chamber 97 in the penalty and split reduction valve device 24 and the split reduction reservoir 9 are charged to the pressure carried in the brake pipe 1.

Fluid under pressure supplied to the brake pipe 1 will flow via a branch pipe 331 (FIG. 1B) to the brake control valve 14 and via a similar branch pipe to the control valve on each car in the train whereupon these control valves operate in response to the charging of the train brake pipe to the normal pressure carried therein to effect a release of the brakes on the locomotive and cars, and charging of the auxiliary reservoir 4, control reservoir 5, and selector volume reservoir 6 on the locomotive and the reservoirs associated with the brake control valves on the cars in the train.

It may be noted that, while the selector valve 187 occupies the freight position in which it is shown in FIG. 1A and the brake valve handle 42 is in the release position, fluid under pressure is supplied from the main reservoir 3 to the chamber 317 (FIG. 2) in the clutch mechanism 216 via the pipe and passageway 58, passageways 79 and 119 (FIG. 1A), chamber 118, passageway 217, groove 198 on selector valve 187 and passageway and pipe 213. Consequently, diaphragm 306 (FIG. 2) will be deflected in the direction of the right hand to move the sleeve 314 in this direction thereby disengaging external clutch face 319 on nut member 318 from internal clutch face 313 on casing 307. Therefore, spindle 321 is free to be moved in either direction to cause spinning of the nut member 318 thereon by the spring 326.

The engineer may now start the train on its journey to the next terminal or station.

SERVICE BRAKE APPLICATION

Let it be supposed that after the train has traveled some distance from its starting point it must descend a grade that requires that the engineer effect a service brake application. Accordingly, the engineer will move the brake valve handle 42 (FIG. 1A) arcuately out of its release position and to a position in its application zone corresponding to the degree of brake application desired. As the handle 42 is thus rotated, it is effective to rotate cam shaft 31, suppression valve cam 29 and service cam 41 therewith in a counterclockwise direction, as viewed in FIG. 2. The contour of the suppression valve cam 29 is such that upon moving the brake valve handle 42 out of its release position to any other position, the cam 29 moves the suppression valve 115 to a position in which the groove 120 thereon registers with that end of the passageway 217 that opens at the wall surface of the bore 116. Consequently, while the suppression valve 115 occupies any of its positions other than its release position, fluid under pressure is vented from the chamber 317 (FIG. 2) in the clutch mechanism 216 to atmosphere via pipe and passageway 213 (FIG. 1A), groove 198 on selector valve 187, passageway 217, groove 120 on and passageway 121 in suppression valve 115, bore 116, chamber 123 and passageway 124.

When fluid under pressure is thus released from the chamber 317, the spring 326 is rendered effective to move the nut member 318, spindle 321 and sleeve 314 in the direction of the left hand, as viewed in FIG. 2, until the external clutch face 319 on the nut member 318 is moved into contact with the internal clutch face 313 on the casing 307.

Since the lower end of the lever 172, as viewed in FIG. 2, abuts both the service cam 41 and the penalty cam 40, the above-mentioned counterclockwise rotation of service cam 41 is effective to rock the lever 172 clockwise about the pin 323 so that the upper end of this lever moves the spindle 321 in the direction of the right hand to first disengage external clutch face 319 from internal clutch face 313 and then cause the nut member 318 to spin or rotate with respect to the spindle 321 as it is moved in the direction of the right hand, it being noted that the direction of the non-self-locking threads on this spindle and nut member are such that the spindle can be moved in the direction of the right hand to cause this spinning of the nut member thereon.

As the lever 172 is thus rocked clockwise, a boss 332 on the left-hand side thereof is moved away from the right-hand end of stem 171 of the control valve device 27 whereupon spring 186 of this control valve device is rendered effective to move supply valve seat piston member 164, supply valve 173, piston member 170 and stem 171 integral therewith in the direction of the right hand so that this stem 171 follows the lever 172. It is apparent from FIG. 2 that, as the supply valve 173 is thus moved in the direction of the right hand, the spring 159 is rendered effective to unseat exhaust valve 160 from its seat 156. When exhaust valve 160 is thus unseated, fluid under pressure from the chamber 44 in the relay valve 22 (FIG. 1A) is vented to atmosphere via passageway 179, chamber 178 (FIG. 2), past unseated exhaust valve 160, bore 155, counterbore 157, bore 154 and the ported cover member 149.

As fluid under pressure is thus vented from the chamber 44, the relay valve device 22 will operate to release fluid under pressure from the train brake pipe whereupon the control valve device 14 on the locomotive and the control valve devices on the cars in the train operate to effect a brake application to a degree corresponding to the degree of reduction of pressure effected in the train brake pipe.

RELEASE OF A SERVICE BRAKE APPLICATION

Only a direct release of the above-described service brake application can now be effected by the engineer. This is accomplished by him manually returning the handle 42 from the position it occupies in its application zone to its release position. As the handle 42 is thus returned toward its release position, the service cam 41 is rotated clockwise, as viewed in FIG. 2, to its release position.

Since the chamber 317 in the clutch mechanism 216 is now void of fluid under pressure, and the external clutch face 319 is biased against the internal clutch face 313 by the spring 326, the spring 327 is unable at this time to move the spindle 321 in the direction of the left hand to cause the nut member 318 to "spin" or rotate thereon and the lever 172 to be rocked counterclockwise about pin 323 to operate the control valve 27 via its stem 117 to cause the supply of fluid under pressure to the chamber 44 (FIG. 1A) in the relay valve device 22 to effect a release of the brakes on the locomotive and cars in the train.

When the brake valve handle 42 and the suppression valve cam 29 are returned to their release position, the suppression valve 115 is returned to the position shown in FIG. 1A. In this position of the suppression valve 115, fluid at main reservoir pressure present in the chamber 118 will flow to the chamber 317 (FIG. 2) in the clutch mechanism 216 via passageway 217, groove 198 on selector valve 187 and passageway and pipe 213.

Upon this resupply of fluid under pressure to the chamber 317, the diaphragm 306 will be deflected in the direction of the right hand to move the sleeve 314 and the nut member 318 in the same direction thereby disengaging the external clutch face 319 on member 318 from the internal clutch face 313 on casing 307.

When the clutch faces 319 and 313 are thus disengaged, the spring 327 is rendered effective to move the spindle 321 in the direction of the left hand to cause the nut member 318 to "spin" thereon. As the spindle 321 is thus moved in the direction of the left hand, it effects counterclockwise rocking of the lever 172 about the pin 323.

As the lever 172 is thus rocked counterclockwise, the boss 332 thereon abuts the end of stem 171 and moves this stem in the direction of the left hand to cause unseating of the supply valve 173 from its seat 169 whereupon fluid under pressure will be supplied from the main reservoir 3 to the chamber 44 in the relay valve 22 via pipe and passageway 58, passageway 177 (FIG. 2), chamber 176, cross-bore 168, counterbore 167, past unseated valve 173, bore 166, chamber 178 and passageway 179, it being noted that fluid under pressure flows from the chamber 178 (FIG. 2) to the chamber 163 via choke 180 to cause the control valve 27 to move to a lap position. Thus, the control valve 27 is operated to increase the pressure in the chamber 44 (FIG. 1A) of the relay valve 22 as the lever 172 is returned to its release position.

The fluid under pressure supplied to the chamber 44 in the relay valve device 22 causes this relay valve to operate to effect recharging of the train brake pipe whereupon the control valves on the locomotive and cars in the train operate to release the brakes and recharge the brake equipment in the usual well-known manner.

OVERSPEED OR TRAIN CONTROL SPLIT REDUCTION BRAKE APPLICATION

If the speed of the diesel engines of the locomotive exceeding a chosen speed, the overspeed relay 296 (FIG. 1C) is deenergized to effect opening of its contact 295 thereby deenergizing the solenoid 281.

If a train enters a block where there is an unfavorable track signal indication, this unfavorable signal indication effects deenergization of the train control relay 299 to effect opening of its contact 298 thereby deenergizing the solenoid 281.

The penalty brake application effected in response to either overspeed of the diesel engines or an unfavorable track signal is the same and will now be described.

When the solenoid 281 is deenergized, the spring 292 is rendered effective to seat lower valve 283 and unseat upper valve 282. Unseating of valve 282 establishes a communication between chamber 260 and the whistle 287 whereupon fluid under pressure will be vented from the chamber 253 below piston 246 and the timing volume 11 to atmosphere via pipe and passageway 254, branch passageway 254a, past check valve 257, chamber 258, passageway 272, chamber 260, past unseated valve 282, chamber 284, passageway 285, choke 286 and the whistle 287, it being noted that the sounding of the whistle is an indication to the engineer that a penalty application is about to occur. The fluid under pressure in the timing volume 11 and piston chamber 253 is, therefore, gradually vented through the whistle 287 at a rate controlled by the size of the choke 286 and after a predetermined time interval, determined by the volume of timing volume 11 with respect to the flow capacity of choke 286 and the whistle 287, such as, for example, six seconds, the pressure in the chamber 253 acting on the piston 246 becomes reduced sufficiently for the spring 247 to move this piston 246 and double beat valve 235 from the position shown in FIG. 1C downward until the piston 246 abuts the pipe bracket 227.

With the double beat valve 235 in its lower position, fluid under pressure is vented from chamber 78 (FIG. 1A) at the right-hand side of the diaphragm 75 of the penalty and split reduction valve device 24 to the stop reservoir 10 via passageways 80 and 82, groove 193 on selector valve 187, passageway and pipe 204, timing reservoir 204a, passageway 242 (FIG. 1C), chamber 241, past the valve 235 now in its lower position to chamber 236 and thence through passageway and pipe 238, passageway 239 (FIGS. 1B, 1A and 1D), a groove 333 on a temporary suppression valve 334 in the suppression valve portion 56, and a passageway and corresponding pipe 335. Some of the fluid under pressure supplied to the passageway 335 flows past a check valve 336 in the suppression valve portion 56 to a passageway 337 which at one end opens into the passageway 127 intermediate the ends thereof. Consequently, the fluid under pressure supplied to the passageway 337 flows to atmosphere via passageway 127, groove 126 on and branch passageway 121a and passageway 121 in suppression valve 115, bore 116, chamber 123 and passageway 124 while the brake valve handle 42 is in its release position and all positions in its application zone including full service position. Fluid under pressure from the chamber 78 in the penalty and split reduction valve device 24 and timing reservoir 204a is thus simultaneously vented to the stop reservoir 10 and to the atmosphere through the brake valve 12 now in release position, and when the pressure in chamber 78 is reduced sufficiently below that in the chamber 77, the diaphragm 75 thereby the penalty and split reduction valve 72 will move in the direction of the right hand, as viewed in FIG. 1A, against the yielding resistance of the spring 114, until the shoulder 104 on the valve 72 is removed into contact with the diaphragm follower plate 100, it being remembered that fluid in the chamber 97 at the same pressure as that normally carried in the train brake pipe is effective at this time to bias this plate 100 against a stop 338 formed on the casing section 18.

It will be noted from FIG. 2 that as the penalty and split reduction valve 72 is thus moved in the direction of the right hand to its second position that the operating stem 103 integral therewith is effective, via link 110, pins 111 and 113 and clevises 109 and 112, to rotate the penalty cam 40 counterclockwise thereby effecting clockwise rocking of the lever 172 about the pin 323.

As the lever 172 is thus rocked clockwise, the control valve device 27 will operate in the manner hereinbefore described to vent fluid under pressure from the chamber 44 (FIG. 1A) of the relay valve device 22 whereupon this valve device 22 operates to release fluid under pressure from the train brake pipe to effect a light brake application on the locomotive and cars in the train to a degree in accordance with the degree of rocking of the lever 172 clockwise about the pin 323, it being remembered that, since fluid under pressure is present in the chamber 317, the spindle 321 is free to be moved in the direction of the right hand by the upper end of lever 172. The above-described light brake application constitutes the first step of a split reduction brake application.

Upon movement of the valve 72 to the position in which the shoulder 104 thereon abuts the plate 100, the two O-rings 105 adjacent the left-hand end of groove 84 both form a seal with the wall surface of the bore 73 at a location on the right-hand side of the location at which the passageway 127 opens at the wall surface of this bore 73. Consequently, fluid under pressure in the chamber 78 will flow to atmosphere via passageway 127, groove 126 on and branch passageway 121a and passageway 121 in suppression valve 115, bore 116, chamber 123, and passageway 124 to insure a reduction of pressure in the chamber 78 and an increase in the differential of pressure acting on the diaphragm 75.

Furthermore, in the above-mentioned second position of valve 72, fluid under pressure supplied from the main reservoir 3 to the chamber 77 via the pathway hereinbefore described flows from this chamber 77 to the dynamic brake cut-out switch 91 (FIG. 1B) and power cut-off switch 92 via passageway 85 in valve 72, passageway and pipe 86, double check valve 89 (FIG. 1B), pipe 90 and branch pipe 90a to respectively cause cut-out of the dynamic brake and a reduction of the speed of the diesel engines on the locomotive to idling speed.

Moreover, in the above-mentioned position of valve 72, communication is closed between passageways 94 and 95 and the groove 93 on this valve 72 establishes a communication between the passageway 95 and an atmospheric passageway 339 having a choke 340 therein. Consequently, fluid under pressure will now flow from the split reduction reservoir 9 and the chamber 97 on the right-hand side of diaphragm 98 to atmosphere via pipe and passageway 207, groove 194 on selector valve 187, passageways 206 and 95, groove 93 on valve 72 and atmospheric passageway 339 at a rate determined by the size of the choke 340 therein.

When the pressure in the chamber 97 and the split reduction reservoir 9 has been reduced by flow to atmosphere via the choke 340 sufficiently for the differential of pressure established on the diaphragm 75 to move the penalty and split reduction valve 72 against the reduced pressure remaining in the chamber 97 at the right-hand side of the diaphragm 98, this valve 72 will be moved in the direction of the right hand from its second position to a third position in which the diaphragm follower 99 abuts the cover member 96. This movement of the valve 72 is effective to further rotate the penalty cam 40 (FIG. 2) in the counterclockwise direction and thereby rock lever 172 clockwise and away from the stem 171 far enough for the control valve device 27 and relay valve device 22 to operate to effect a full service brake application on the locomotive and cars in the train.

Upon movement of the penalty and split reduction valve 72 to its third position, fluid under pressure will flow (1) from the chamber 78 to atmosphere, (2) from the main reservoir 3 to the dynamic brake cut-out switch 91 and power cut-off switch 92, and (3) from the chamber 97 and split reduction reservoir 9 to atmosphere via the pathways described above for the second position of the valve 72.

RECHARGING OF BRAKE PIPE SUBSEQUENT TO OPERATION OF PENALTY AND SPLIT REDUCTION VALVE DEVICE TO EFFECT A FULL SERVICE BRAKE APPLICATION IN RESPONSE TO OVERSPEED OF THE DIESEL ENGINES OR AN UNFAVORABLE SIGNAL OR TRAFFIC CONDITION

In order to effect recharging of the brake pipe 1 following a reduction of pressure effected therein by the above-described automatic operation of the penalty and split reduction valve device 24, either the overspeed relay 296 (FIG. 1C) must be energized in response to a reduction in the speed of the diesel engines to the hereinbefore-mentioned chosen speed, or the train control relay 299 must be energized in response to a clear track signal indicating favorable traffic conditions depending upon whether the penalty brake application was the result of overspeed of the diesel engines of an unfavorable track signal, it being understood that both the overspeed relay 296 and train control relay 299 must be energized so that their respective contacts 295 and 298 are closed in order to complete the power supply circuit to the solenoid 281 of the magnet valve device 231. When the power supply circuit to the solenoid 281 is completed, the upper valve 282 is seated and the lower valve 283 unseated so as to close the vent communication between passageway 272 and whistle 287 and reestablish communication between passageways 289 and 272 to recharge chamber 253 and timing volume 11 from the reducing valve device 233. This recharging of the chamber 253 and timing volume 11 causes piston 246 to move upward to reseat double beat valve 235 in its upper position for closing communication between the passageway 242 that is connected to the chamber 78 in the penalty and split reduction valve device 24 via a pathway hereinbefore described and the passageway and pipe 238 which is connected through the suppression valve portion 56 (FIG. 1D) to the stop reservoir 10 and also past the check valve 336 to atmosphere when the handle 42 (FIG. 1A) of the engineer's automatic brake valve 12 is in its release position, as hereinbefore stated.

When the double beat valve 235 (FIG. 1C) is thus seated in its upper position, the fluid under pressure supplied from the main reservoir 3 through the choke 81 (FIG. 1A) in the penalty and split reduction valve device 24 to the passageway 80 and chamber 78 can still flow to atmosphere via passageway 127, groove 126, branch passageway 121a, passageway 121 in suppression valve 115, bore 116, chamber 123 and passageway 124 in brake valve 12. Therefore, the brake valve handle 42 must be moved by the engineer from its release position to its suppression position, as explained in hereinbefore-mentioned U.S. Pat. No. 3,076,681, to move the suppression valve 115 to its suppression position in which the passageway 127 is cut off from atmosphere.

Subsequent to moving handle 42 to its suppression position to cause cut off of passageway 127 from atmosphere, the fluid under pressure supplied from main reservoir 3 through choke 81 will flow to chamber 78 via passageway 80 to increase the pressure therein. When the pressure in chamber 78 and the force exerted by the spring 114 is substantially equal to the pressure in the chamber 77, the spring 114 is rendered effective to move the valve 72 in the direction of the left hand from its above-mentioned third position to its first position in which it is shown in FIG. 1A. In this position, the groove 93 on valve 72 reestablishes the communication between passageways 94 and 95.

After the valve 72 has returned to the position shown in FIG. 1A, the engineer will move the brake valve handle 42 from its suppression position back to its release position to effect movement of the suppression valve 115 back to its release position in which it is shown in FIG. 1A, in which position communication between passageways 129 and 94 is reestablished via the groove 128 on suppression valve 115. Consequently, the chamber 97 in the valve device 24 and the split reduction reservoir 9 will be recharged to the pressure carried in the train brake pipe by operation of the relay valve device 22 in a manner now to be described.

Referring to FIG. 2, it will be seen that as the penalty and split reduction valve 72 is moved in the direction of the left hand from its third position back to its first position in which it is shown, it is effective to rotate the penalty cam 40 clockwise. Since handle 42 is in release position, chamber 317 is supplied with fluid under pressure. Therefore, this clockwise rotation of cam 40 allows spring 327 to effect counterclockwise rocking of lever 172 which in turn moves the stem 171 in the direction of the left hand so that the parts of the control valve device 27 are returned to the position shown in FIG. 2. Consequently, the control valve 27 will now supply fluid under pressure to the chamber 44 of the relay valve device 22 which in turn will effect a recharge of the train brake pipe and a release of the brakes on the locomotive and cars in the train.

SAFETY CONTROL SPLIT REDUCTION BRAKE APPLICATION

The pedal 267 (FIG. 1C) of the foot valve 17 must be held in a depressed position by the engineer at all times except when a chosen degree of brake application is in effect, as explained hereinafter.

If at any time the engineer removes his foot from the pedal 267 while the brakes on the locomotive are released, or applied to a degree less than the just-mentioned chosen degree, the communication between pipes 268 and 266 is closed and a communication between pipe 266 and atmosphere is established whereupon fluid under pressure will be vented from the chamber above diaphragm 263 to atmosphere via passageway and pipe 266 and the foot valve 17. As fluid under pressure is thus released from the chamber above diaphragm 263, the spring 277 is rendered effective to deflect this diaphragm upward to move the valve 264 upward from the position shown in FIG. 1C to a position in which the groove 269 on this valve establishes a communication between the passageways 270 and 278 whereupon fluid under pressure will be vented from the chamber 253 below piston 246 and the timing volume 11 to atmosphere via pipe and passageway 254, branch passageway 254a, passageway 270, groove 269, passageway 278, choke 280 and the whistle 279 which may have a different tone than that of the whistle 287 to indicate by this tone that a safety control brake application rather than an overspeed or train control brake application is impending.

When fluid under pressure is thus vented from the chamber 253 to atmosphere, the timing valve device 229 and the penalty and split reduction valve device 24 operate in the manner hereinbefore described to effect a brake application on the locomotive and cars in the train.

It may be noted that should the solenoid 281 become deenergized as the result of overspeed of the diesel engines or an unfavorable track signal indication while the valve 264 is in its upper position as a result of the engineer removing his foot from the pedal 267 of foot valve 17, the spring 292 will effect seating of lower valve 283 and unseating of upper valve 282 whereupon fluid under pressure is released from the chamber 253 to atmosphere via passageway 254, branch passageway 254a, past check valve 257, chamber 258, passageway 272, chamber 260, past unseated valve 282, chamber 284, passageway 285, choke 286, and whistle 287 simultaneously as fluid under pressure is released from this chamber 253 via the whistle 279. Consequently, the piston 246 will be moved downward after a shorter period of time than when only a safety control, an overspeed or a train control brake application occurs. It is, therefore, apparent that should the solenoid 281 become deenergized immediately subsequent to the engineer removing his foot from the foot pedal 267, the resulting brake application occurs in less time than a brake application resulting from only the release of the pedal 267 of foot valve 17.

RECHARGING OF BRAKE PIPE SUBSEQUENT TO A SAFETY CONTROL BRAKE APPLICATION

In order to effect a brake release subsequent to a safety control brake application resulting from the engineer releasing the pedal 267 of foot valve 17, the engineer must (1) depress this pedal to reestablish communication between pipes 268 and 266, (2) move the brake valve handle 42 from its release position to its suppression position to close communication between the passageway 127 and atmosphere to cause the return of the penalty and split reduction valve 72 to the position in which it is shown in FIG. 1A in the manner hereinbefore explained, and (3) move the handle 42 from its suppression position back to its release position subsequent to the return of the valve 72 to the position shown.

Upon the return of the valves 72 and 115 to the position shown in FIG. 1A, the pipe 204 and the split reduction reservoir 9 will be recharged with fluid under pressure in the manner hereinbefore described. Consequently, fluid under pressure will flow from the pipe 204 to the chamber above the diaphragm 263 (FIG. 1C) via pipe 268, foot valve 17, and pipe and passageway 266 to cause downward deflection of this diaphragm against the yielding resistance of the spring 277 and thereby movement of the spool valve 264 downward to the position shown.

Upon the return of the valve 264 to the position shown, fluid under pressure will be supplied from the reducing valve device 233 to the chamber 253 via the pathway hereinbefore described. This supply of fluid under pressure to the chamber 253 moves the piston 246 and double beat valve 235 upward to the position shown to close communication between the passageways 242 and 238 thereby closing communication between the pipe 204 and the stop reservoir 10.

It will be understood that as the penalty and split reduction valve 72 is returned to the position shown, the penalty cam 40, lever 172, control valve 27 and relay valve device 22 operate in the manner hereinbefore described to effect recharging of the train brake pipe and a release of the brakes on the locomotive and cars in the train.

SUPPRESSION OF AN OVERSPEED OR TRAIN CONTROL BRAKE APPLICATION BY THE ENGINEER

If the engineer on the locomotive is alert, he may prevent operation of the penalty and split reduction valve device 24 in response to overspeed of the diesel engines or an unfavorable traffic signal by operating the engineer's automatic brake valve within a certain interval of time after the whistle 287 starts to sound.

If the warning sounds, the engineer must promptly demonstrate his alertness by moving the brake valve handle 42 out of its release position to effect either a temporary suppression or a permanent suppression of an automatic overspeed or train control application of brakes in the same manner as describe in hereinbefore-mentioned U.S. Pat. No. 3,076,681. Since the operation of the suppression valve portion 56 of the present invention is the same as that of the suppression valve portion 62 shown in U.S. Pat. No. 3,076,681, a detailed description of the operation of this suppression valve portion 56 is deemed unnecessary to an understanding of the present invention.

GRADUATED RELEASE OPERATION IN PASSENGER SERVICE

To condition the locomotive brake equipment for graduated release operation when it is used in passenger service, the handle 190 of the selector valve device 28 will be rotated to move the selector valve 187 from its freight position in which it is shown in FIG. 1A downward to its passenger position.

In the passenger position of the selector valve 187 the groove 198 thereon no longer establishes a communication between the passageways 217 and 213. However, in this passenger position of valve 187, the groove 197 thereon establishes a communication between the passageways 212 and 213. Therefore, fluid under pressure is constantly supplied from the main reservoir 3 to the chamber 317 in the clutch mechanism 216 via pipe and passageway 58, passageway 226, past check valve 223, chamber 214, passageway 212, groove 197 and passageway and pipe 213.

Also, in the passageway position of the selector valve 187, the groove 195 thereon establishes a communication between the passageway 203 and atmosphere via the choke 200, passageway 201, bore 83, passageway 202, chamber 123 and passageway 124 so that the chamber 71 in the brake pipe cut-off valve device 23 remains vented to atmosphere, and the groove 193 establishes communication between the passageways 82 and 204 as in freight position.

Moreover, in the passenger position of valve 187, the groove 194 thereon no longer establishes communication between the passageways 206 and 207, and the two O-rings 199, adjacent the upper end of this groove 194, respectively form a seal with the wall surface of the bore 83 above and below the location at which the passageway 206 opens at the wall surface of this bore. Consequently, flow of fluid under pressure to the split reduction reservoir 9 to effect the charging thereof is cut off and the split reduction feature cut out while the locomotive is operating in passenger service.

With fluid under pressure constantly supplied to the chamber 317 (FIG. 2) in the clutch mechanism 216, the external clutch face 319 on the nut member 318 is maintained out of clutching contact with the internal clutch face 313 on the casing 307. Accordingly, whenever either the penalty cam 40 or the service cam 41 is rotated clockwise, as viewed in FIG. 2, toward their release position, the spring 327 is free to rock the lever 172 counterclockwise so that the lower end of this lever remains in contact with these cams and the boss 332 on this lever abuts the stem 171 to move it in the direction of the left hand. Consequently, as the penalty cam 40 is returned to its release position by the penalty and split reduction valve 72 as it is returned to the position shown in FIG. 1A subsequent to a penalty brake application, the control valve device 27 and the relay valve device 22 are operated to effect a graduated release of the brakes. Likewise, as the service cam 41 is returned to its release position by the engineer moving the brake valve handle 42 to its release position subsequent to a manually effected brake application, the valve devices 27 and 22 are operated to effect a graduated release.

Except as pointed out above, the operation of the brake equipment constituting the present invention is the same while the locomotive is used in passenger service as while it is used in freight service.

CUT-OUT POSITION OF SELECTOR VALVE

Whenever a locomotive provided with the brake equipment constituting the present invention is not the leading locomotive in a train, the handle 190 of the selector valve device 28 will be rotated to move the selector valve 187 from its freight position in which it is shown in FIG. 1A upward to its cut-out position.

In this cut-out position of the selector valve 187, the groove 196 thereon establishes a communication between the passageways 208 and 203. Therefore, fluid under pressure will flow from the brake pipe 1 to the chamber 71 in the brake pipe cut-off valve device 23 via pipe and passageway 63, passageway 221, choke 222, past check valve 218, chamber 210, passageways 209 and 208, groove 196 and passageway 203. Fluid under pressure thus supplied to the chamber 71 is effective to move annular member 64 in the direction of the right hand, as viewed in FIG. 1A, to the position shown in which the spring 68 effects seating of the cut-off valve 61 on its seat 69 thereby cutting off the relay valve device 22 from the brake pipe 1. Consequently, variations of pressure in the brake pipe can be controlled only by operation of the brake valve on the leading locomotive.

CUT OUT OF SAFETY CONTROL UPON EFFECTING A BRAKE APPLICATION OF A CHOSEN DEGREE

It may be noted from FIG. 1C of the drawings that a part of the fluid under pressure supplied to the brake cylinder 2 by operation of the relay valve 16 flows through the pipe and passageway 276 to the chamber above the diaphragm 273 to deflect this diaphragm downward. This downward deflection of the diaphragm 273 moves the stem 275 downward until its lower end abuts the diaphragm follower plate on the upper side of the diaphragm 263. Consequently, when the pressure in the chamber above the diaphragm 273 has been increased sufficiently to overcome the force exerted in an upward direction by the spring 277, the engineer may remove his foot from the pedal 267 of the foot valve 17 whereupon fluid under pressure will be released from the chamber above the diaphragm 263 to atmosphere via passageway and pipe 266 and the foot valve 17. The fluid under pressure in the chamber above the diaphragm 273 will now maintain the spool valve 264 in the position shown so that the spring 277 is unable to move this valve upward to the position in which the groove 269 thereon establishes a communication between the passageways 270 and 278 to release fluid under pressure from the chamber 253 below piston 246 to atmosphere via whistle 279 which would effect a brake application in the manner hereinbefore described.

EMERGENCY BRAKE APPLICATION

An emergency brake application on the locomotive and cars in the train can be effected at any time by the engineer moving the brake valve handle 42 to its emergency position. Whenever the handle 42 is moved to its emergency position, the cam 30 is rotated therewith to its emergency position. The contour of the cam 30 is such that when it is rotated to its emergency position, it is effective via stem 140 to move emergency valve 138 in the direction of the left hand, as viewed in FIG. 1A, to cause the stem 139 to unseat the vent valve 130 from its seat 132. When the vent valve 130 is thus unseated, fluid under pressure is released from the brake pipe 1 to atmosphere at an emergency rate via pipe and passageway 63, chamber 131, past unseated vent valve 130, bore 137, a passageway 341 in the casing section 18, chamber 123 and passageway 124.

Having now described the invention, what we claim as new and desire to secure by Letters Patent, is:

1. A locomotive brake control apparatus comprising:
   a. a brake pipe normally charged with fluid under pressure, the variations of pressure in which effect a brake application and a brake release,
   b. a main reservoir,
   c. a split reduction reservoir,
   d. a stop reservoir, wherein the improvement comprises:
   e. a manually operative engineer's brake valve device comprising:
      i. a self-lapping relay valve device operative by variations of pressure to correspondingly effect the supply of fluid under pressure from said main reservoir to said brake pipe and the release of fluid under pressure from said brake pipe to atmosphere,
      ii. a self-lapping control valve device operative to effect directly the supply of fluid under pressure from said main reservoir to said relay valve device to establish in said relay valve device any desired selected pressure and the release of fluid under pressure from said relay valve device to atmosphere thereby to control said variations of pressure to operate said relay valve device, said control valve device being automatically operative to maintain said desired established pressure notwithstanding leakage of the fluid under pressure supplied thereby to said relay valve device,
      iii. a three-position fluid pressure operated penalty and split reduction valve operable responsively to variation of a control fluid pressure from a first position in which it establishes a charging communication via which said split reduction reservoir is charged by said self-lapping relay valve device, to a second position in which it cuts off charging of said reservoir and establishes a restricted venting communication via which said split reduction reservoir is vented to atmosphere, said penalty and split reduction valve remaining in said second position until the pressure in said split reduction reservoir is blown down to a chosen value through said restricted venting communication at which time said penalty and split reduction valve is moved from its second position to its third position, in consequence of which the flow of fluid under pressure from said split reduction reservoir to atmosphere via said restricted venting communication is continued so as to be thereby so controlled as to effect a two-stage split reduction of the pressure in said split reduction reservoir, iv. mechanical means operably connecting said penalty and split reduction valve and said control valve device for effecting operation of said control valve device by said penalty and split reduction valve to cause said relay valve device to operate to effect a corresponding two-stage split reduction of pressure in said brake pipe, and v. means selectively controlled by an operator to render said mechanical means effective to cause said control valve means to effect either a graduated or a direct release of brakes, f. fluid pressure operated means operable in response to a release of fluid under pressure therefrom to vent said control fluid pressure to said stop reservoir to cause operation of said penalty and split reduction valve from its said first to its said second position, g. a first means operative in response to a control impulse to effect a release of fluid under pressure from said fluid pressure operated means, and h. a second means operative in response to the incapacitation of an operator to effect a release of fluid under pressure from said fluid pressure operated means.

2. A locomotive brake control apparatus, as claimed in claim 1, further characterized by a pair of coaxial spaced-apart abutments, one of which is subject on its respective opposite sides to said control fluid pressure which is varied on one side, said one abutment having a rigid connection with said penalty and split reduction valve, and the other of said abutments being subject on its respective opposite sides to atmospheric pressure and the pressure in said split reduction reservoir, said other abutment having a lost-motion connection with said penalty and split reduction valve whereby said other abutment, subsequent to said blowdown of said split reduction reservoir pressure to said chosen value operates cojointly with said one abutment in response to simultaneous further reduction of said control fluid pressure on said one side of said one abutment, and of the pressure in said split reduction reservoir on one side of said other abutment, to control movement of said penalty and split reduction valve from its said second position to its third position.

3. A locomotive brake control apparatus, as claimed in claim 1, further characterized in that said manually operative engineer's brake valve device includes a multi-position suppression valve so interlocked with said penalty and split reduction valve that each must occupy its first position to effect the charging of said split reduction reservoir, and that said suppression valve must be moved out of its said first position to another of its positions, subsequent to movement of said penalty and split reduction valve to its said third position, to cause return of said penalty and split reduction valve from its third position to its first position.

4. A locomotive brake control apparatus, as claimed in claim 1, further characterized in that said mechanical means comprises:

a. a pivoted lever rockable in one direction to cause operation of said control valve device to decrease the pressure of fluid supplied thereby for operating said relay valve device, and rockable in an opposite direction to cause operation of said control valve device to increase the pressure of fluid supplied thereby for operating said relay valve device, b. a pair of rotatable cams, the rotation of each of which in one direction, independently of the other, effects rocking of said lever in said one direction, c. manually operated means for effecting rotation of one of said pair of cams in said one direction and in an opposite direction, d. linkage means connecting the other of said cams and said penalty and split reduction valve for effecting rotation of said other cam in said one direction upon movement of said valve from its one position to its second and third positions, and in said opposite direction upon movement of said valve from its third position to its said one position, and e. means for effecting rocking of said lever in said opposite direction simultaneously as said one or the other of said cams is rotated in said opposite direction.

5. A locomotive brake control apparatus, as claimed in claim 1, further characterized in that said first means operative in response to a control impulse comprises:

a. a supply valve for controlling the supply of fluid under pressure to said fluid pressure operated means, b. a release valve operably connected to said supply valve for controlling the release of fluid under pressure from said fluid pressure operated means, c. a solenoid for so simultaneously operating said supply and release valves that while said solenoid is energized said supply valve is open and said exhaust valve is closed, and while said solenoid is deenergized said supply valve is closed and said exhaust valve is open, and d. a power supply circuit for said solenoid, said power supply circuit comprising:

i. a pair of contacts disposed in series relation in said power supply circuit, ii. a first relay for operating one of said contacts from its closed position to its open position in response to an unfavorable speed condition, and iii. a second relay for operating the other of said contacts from its closed position to its open position in response to an unfavorable signal indication.

6. A locomotive brake control apparatus, as claimed in claim 1, further characterized in that said second means operative in response to the incapacitation of an operator comprises:

a. a spool valve movable from a first position in which it effects the supply of fluid under pressure to said fluid pressure operated means to a second position in which it effects the release of fluid under pressure from said fluid pressure operated means to atmosphere, b. fluid pressure operated means responsive to the supply of fluid under pressure thereto to effect movement of said spool valve to its first position, c. biasing means responsive to the release of fluid under pressure from said fluid pressure operated means to effect movement of said spool valve from its first position to its second position, and d. means operable by the operator to effect the supply of fluid under pressure to said fluid pressure operated means and operable in response to the incapacity of the operator to release fluid under pressure from said fluid pressure operated means to atmosphere.

7. A locomotive brake control apparatus, as claimed in claim 1, further characterized in that said first means and said second means are operable simultaneously, each independently of the other, to effect release of fluid under pressure from said fluid pressure operated means.

8. A locomotive brake control apparatus, as claimed in claim 1, further characterized in that said first means and said second means are so arranged in series as to cojointly control the supply of fluid under pressure to said fluid pressure operated means, and by a check valve via which said first means effects a release of fluid under pressure from said fluid pressure operated means independently of said second means.

9. A locomotive brake control apparatus, as claimed in claim 3, further characterized in that said means selectively controlled by an operator to render said mechanical means effective to cause said control valve means to effect either a graduated or a direct release of brakes comprises:

a. a stationary annular clutch element having a clutch face, b. a movable clutch element coaxial with said stationary annular clutch element and constituting a nut member having a clutch face for cooperation with said clutch face on said stationary annular clutch element and internal non-self-locking screw threads, c. a nonrotatable movable member for operating said mechanical means and having external non-self-locking screw threads whereby said movable clutch element is rotatively mounted on said member, d. fluid pressure operated means operably connected to said movable clutch element for effecting disengagement of said clutch faces, e. means for effecting rotation in one direction of said member relative to said movable clutch element, while said clutch faces are disengaged, to operate said mechanical means to effect operation of said control valve device to cause said relay valve device to operate to increase the pressure in said brake pipe, f. means operable in response to the release of fluid under pressure from said fluid pressure operated means for effecting engagement of said clutch faces to render said movable clutch element nonrotatable and thereby said nonrotatable movable member immovable, and g. a multi-position manually operable means for in one position simultaneously rendering said penalty and split reduction valve operable to control the charging of said split reduction reservoir and said suppression valve operable to control the supply of fluid under pressure to said fluid pressure operated means, and for in another position cutting off control or charging of said split reduction reservoir by said penalty and split reduction valve and constantly supplying fluid under pressure to said fluid pressure operated means independently of said suppression valve means.

10. A locomotive fluid pressure brake control apparatus comprising:

a. a self-lapping relay valve device operative responsively to a reduction of pressure to cause a brake application and to an increase of pressure to cause a brake release, b. a self-lapping control valve device operative to control said reduction and increase of pressure to operate said relay valve device, wherein the improvement comprises:

c. a pair of cams so mounted that each is rotatable out of a first position independently of the other, d. mechanical means so interposed between said pair of cams and said control valve device that rotation of each cam in one direction causes said mechanical means to operate said control valve device to effect said reduction of pressure whereupon said relay valve device operates to cause said brake application, said mechanical means being operative, upon rotation of either of said cams in an opposite direction subsequent to its rotation in said one direction, to operate said control valve device to effect said increase of pressure whereupon said relay valve device operates to cause said brake release, and e. means selectively operable to cause said mechanical means to operate said control valve device either simultaneous as one or the other of said cams is rotated in said opposite direction or subsequent to rotation of one or the other of said cams in said opposite direction to its said first position.

11. A locomotive fluid pressure brake control apparatus, as claimed in claim 10, further characterized by a manually rotatable cam shaft coaxial with said cams and on which one of said cams is rigidly mounted for rotation therewith, the other of said cams being rotatable with respect to said shaft.

12. A locomotive fluid pressure brake control apparatus, as claimed in claim 10, further characterized in that said mechanical means comprises a lever pivoted intermediate its ends, said lever being so arranged that said cams and said selective operable means are disposed on one side thereof so as to abut its respective opposite ends, and said control valve is disposed on the other side thereof so as to abut said lever intermediate its pivot and that end thereof that is in abutting relationship with said selective operable means.

13. A locomotive fluid pressure brake control apparatus, as claimed in claim 12, further characterized in that said means selectively operable to cause said pivoted lever to operate said control valve device comprises:

a. a nonrotatable movable rod member having a collar abutting one end of said lever and an external non-self-locking screw thread on one side of said collar,
b. a stationary annular clutch element having a clutch face,
c. a movable clutch element having a clutch face coaxial and cooperative with said clutch face on said stationary annular clutch element and internal non-self-locking screw threads engaging the non-self-locking screw threads on said nonrotatable movable rod member thereby mounting said movable clutch element for rotation on said nonrotatable movable rod,
d. yieldable means for causing clutching contact between said clutch faces to render said movable clutch element nonrotatable and thereby said nonrotatable movable rod member immovable,
e. fluid pressure operated means for moving said movable clutch element against the resistance of said yieldable means to cause said clutch face on said movable clutch element to be moved out of contact with said clutch face on said stationary clutch element,
f. means interposed between said collar and said stationary clutch element operative, while said clutch faces are disengaged, to move said nonrotatable movable rod member in the direction to cause rotation of said movable clutch element thereon and rocking of said lever in the direction to operate said control valve device to effect said increase of pressure, and
g. a manually operated selector valve for in one position constantly supplying fluid under pressure to said fluid pressure operated means, and in another position placing the supply of fluid under pressure to said fluid pressure operated means under selective manual control of the engineer thereby enabling said engineer to select graduated or direct release of brakes on the train.

14. A locomotive fluid pressure brake control apparatus, as claimed in claim 13, further characterized in that said apparatus comprises a manually operated suppression valve for in one position, while said selector valve is in said other position, effects the supply of fluid under pressure to said fluid pressure operated means via said selector valve, and for in another position cutting off said supply of fluid under pressure to said fluid pressure operated means via said selector valve.

15. A locomotive fluid pressure brake control apparatus, as claimed in claim 13, further characterized in that said apparatus comprises a brake pipe cut-off valve device via which said relay valve device supplies and releases fluid under pressure to cause a brake release and a brake application, and in that said selector valve is movable from its first and its second positions in which it establishes a communication through which said brake pipe cut-off valve device is vented to atmosphere to enable opening thereof by fluid under pressure supplied by said relay valve device, to a third position in which it establishes a communication through which fluid under pressure may be supplied to said brake pipe cut-off valve to effect closing thereof.

* * * * *